United States Patent
Koolmeister

(10) Patent No.: US 11,873,854 B1
(45) Date of Patent: Jan. 16, 2024

(54) RELEASABLE CONNECTION FRAME ASSEMBLY

(71) Applicant: Miles Koolmeister, Maple Grove, MN (US)

(72) Inventor: Miles Koolmeister, Maple Grove, MN (US)

( * ) Notice: Subject to any disclaimer, the term of this patent is extended or adjusted under 35 U.S.C. 154(b) by 708 days.

(21) Appl. No.: 17/106,847

(22) Filed: Nov. 30, 2020

Related U.S. Application Data

(60) Provisional application No. 62/942,183, filed on Dec. 1, 2019.

(51) Int. Cl.
*F16B 21/12* (2006.01)

(52) U.S. Cl.
CPC ............ *F16B 21/12* (2013.01); *F16B 21/125* (2013.01)

(58) Field of Classification Search
CPC .......... F16B 5/0092; F16B 5/10; F16B 7/044; F16B 7/046; F16B 7/20; F16B 21/04; F16B 21/125; F16B 21/14; E04H 15/08; E04F 10/0603; E04F 10/0614; B60P 3/343
See application file for complete search history.

(56) References Cited

U.S. PATENT DOCUMENTS

| | | |
|---|---|---|
| 2,337,457 A | 12/1943 | Dzus |
| 2,619,390 A | 11/1952 | Johnson |
| 2,665,950 A | 1/1954 | Johnson |
| 3,488,815 A | 1/1970 | Metz |
| 3,834,400 A * | 9/1974 | Sattler ................. E04F 10/0681 160/68 |
| 3,981,517 A * | 9/1976 | Crochet, Sr. ............. B60D 1/26 280/478.1 |
| 4,020,888 A | 5/1977 | Upton |
| 4,227,287 A | 10/1980 | Gunther |
| 4,508,126 A * | 4/1985 | Everard ............. E04F 10/0651 160/67 |
| 4,719,954 A * | 1/1988 | Curtis ................ E04F 10/0614 160/67 |
| 4,943,182 A | 7/1990 | Hoblingre |
| 5,172,743 A * | 12/1992 | Wallace ............. E04F 10/0651 160/67 |
| 5,174,352 A | 12/1992 | Murray |
| 5,622,214 A | 4/1997 | Baka |

(Continued)

FOREIGN PATENT DOCUMENTS

EP 1589184 A1 * 10/2005 ............. E06B 9/174

*Primary Examiner* — Matthew R McMahon
(74) *Attorney, Agent, or Firm* — Edwin E. Voigt, II

(57) ABSTRACT

A releasable connection frame assembly includes a first support having a first end. Right and left connecting plates are connected to the first end, the connecting plates have alignment guides having angular guide edges and a load axis aperture. The connecting plates are reverse images of each other. A second support has a second end, an interior, opposite sides, first and second load pin apertures, and first and second release pin apertures proximate to the second end. A quick release is disposed in the second end and has a spring, first and second prongs, first and second load pins, and first and second release pins. The load pins pass through the alignment guides to releasably engage the load axis apertures to connect the first and second supports together. The release pins permit separation of the first and second supports from an engaged configuration.

14 Claims, 7 Drawing Sheets

(56) References Cited

U.S. PATENT DOCUMENTS

| | | | | |
|---|---|---|---|---|
| 5,752,556 | A | * | 5/1998 | Steadman ............ E04F 10/005 160/78 |
| 6,021,834 | A | * | 2/2000 | Malott ................ E04F 10/0603 160/67 |
| 2003/0094833 | A1 | * | 5/2003 | Thompson ............. E04H 15/08 296/173 |
| 2007/0031184 | A1 | * | 2/2007 | Baxstrom ............. F16B 21/125 403/109.3 |

* cited by examiner

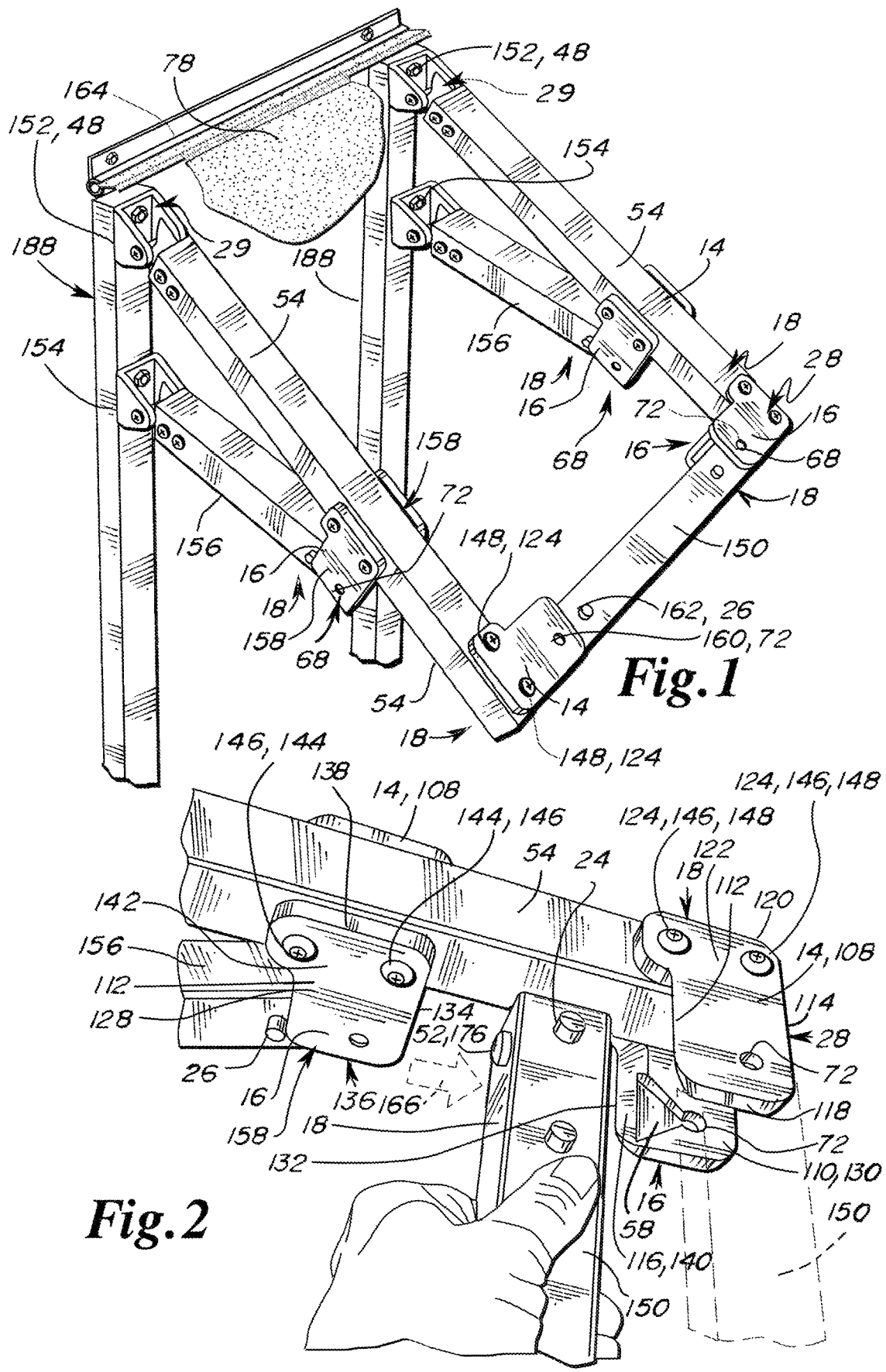

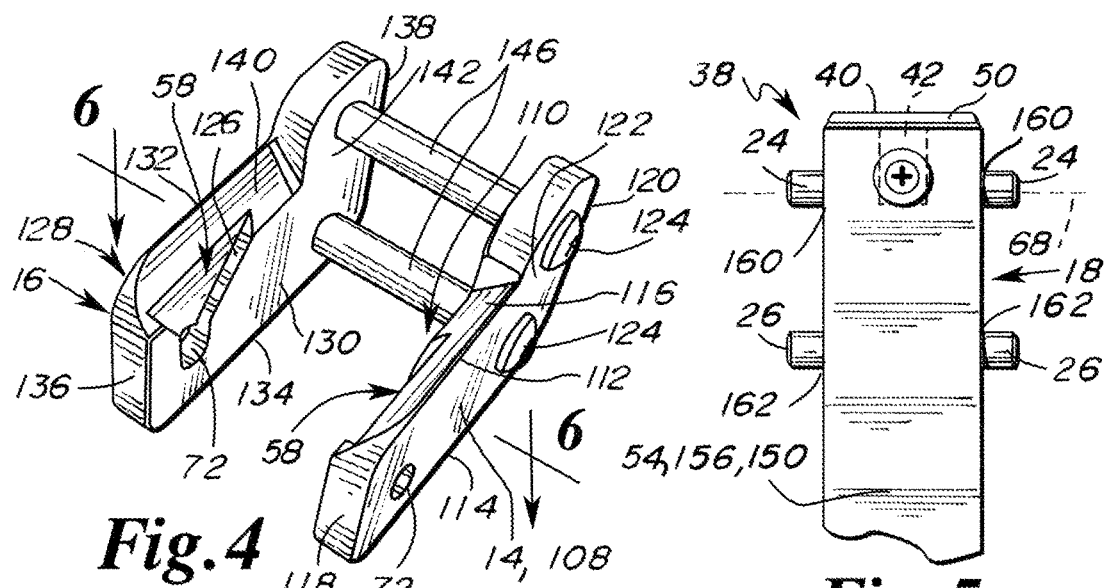
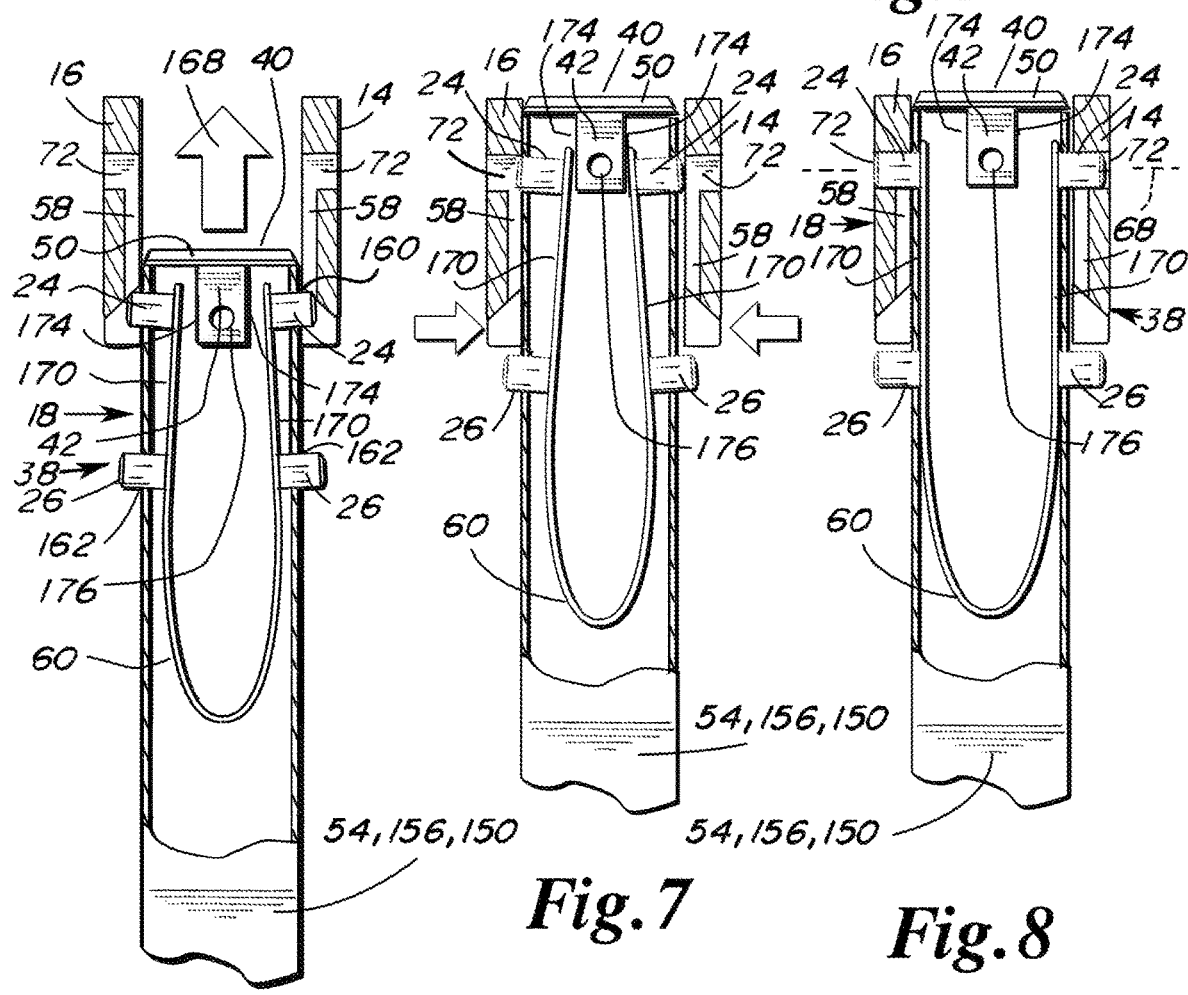
Fig.4
Fig.5
Fig.6
Fig.7
Fig.8

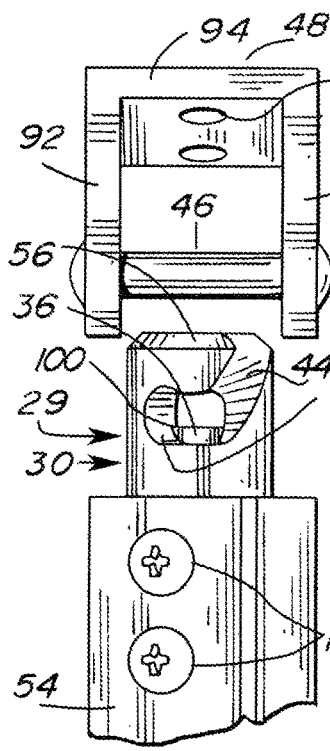 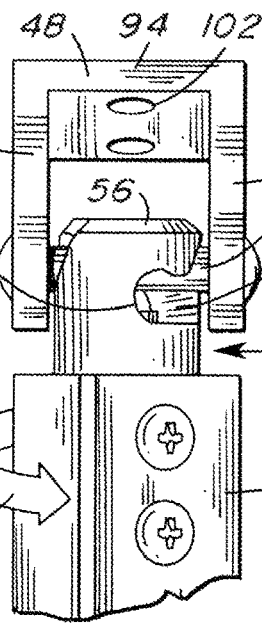 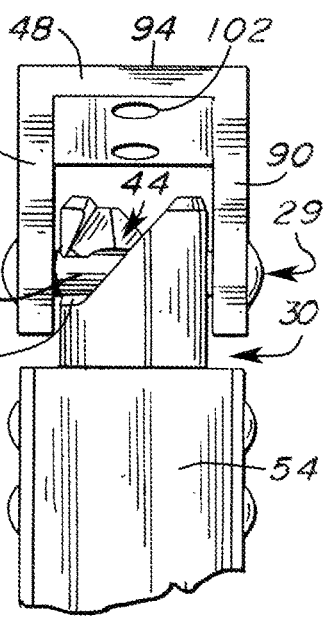
Fig.9  Fig.10  Fig.11
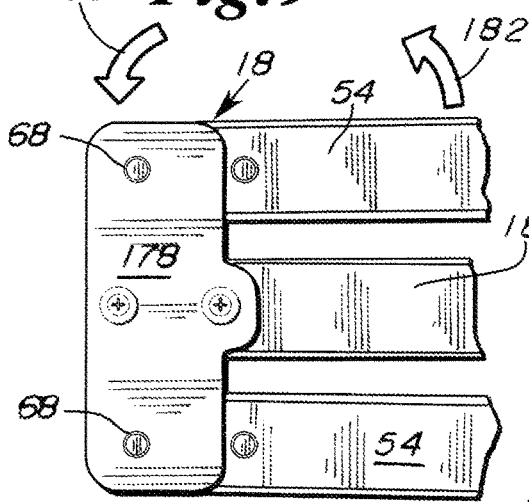 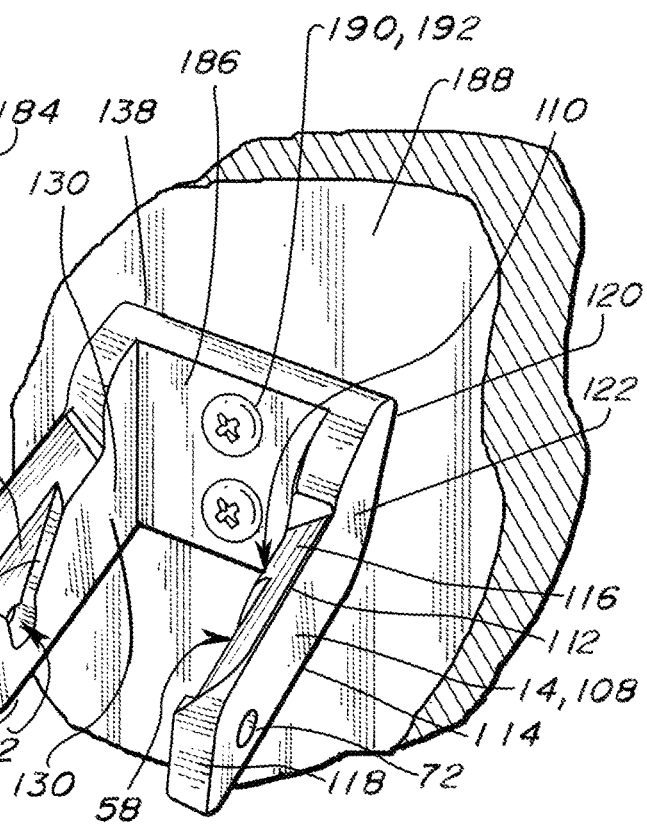
Fig.12  Fig.13

RELEASABLE CONNECTION FRAME ASSEMBLY

CROSS-REFERENCE TO RELATED APPLICATIONS

This application claims the benefit of U.S. Provisional Patent Application Ser. No. 62/942,183 filed Dec. 1, 2019, which is incorporated by reference herein in its entirety.

FIELD OF THE INVENTION

This application in general is directed to snap quick release connector components for awnings and other structures, to facilitate the assembly, disassembly, use and storage of a structure.

BACKGROUND

In the past it has been difficult to secure awnings to frames engaged to the sides of trailers, buildings or other types of permanent or movable structures. The awning frames as known are frequently long extending in excess of 8, 10, 12, and 13 feet in length.

During assembly, an individual was frequently required to transport, position, and use a ladder to reach connections or joints of structural components in order to secure the same together. An individual was frequently required to reach a significant height above an individual's head, while standing on a ladder, in order to insert a pin used to releasably secure the structural components of an awning together.

In some embodiments, the attachment of a structural support for an awning is quite difficult, necessitating an individual to align apertures through a structural support with apertures of a bracket, or other telescoping structural member, and to simultaneously insert a removable pin through all of the aligned apertures. These efforts may be extremely difficult due to the absence of convenient visualization of the aligned apertures, and the need to lift and to hold the structural supports in a desired elevated position or location during insertion of the removable pin.

No devices have been known which enable an individual to safely, quickly and conveniently snap structural support components of an awning together, without the need for ladders and pins, during the assembly of the structural support components. No device is known which facilitates the disassembly of the structural components of an awning following use for transportation of the structure components to another location or into storage.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entirety.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

In at least one embodiment, the structural frame components of an awning are tubular having a quick release cam assembly at a first end. Rotation of the structural frame component approximately 90 degrees secures the cam assembly and structural frame component to a bracket as engaged to a wall of the building, trailer, or other structure.

In at least one alternative embodiment, a structural frame component at the second or distal end includes a quick release assembly including components such as spring, load pins, release pins and connecting plates.

In another alternative embodiment, the second or distal ends of some of the structural frame components include an end cap having an interior stop which prevents excessive depression and binding of the load pins or release pins within a corresponding load pin aperture or release pin aperture.

In at least one additional alternative embodiment, the connection plates include alignment guides or channels which direct the load pins of some of the structural frame components into engagement with load pin apertures.

In at least one alternative embodiment, the load pins and release pins are integral with a compression spring which is located within the second or distal end of a structural frame component.

In another alternative embodiment, the structural frame components for an awning may be quickly and easily assembled or disassembled without the use of tools, ladders, or external fastening components such as cotter or release pins.

In at least one additional alternative embodiment, a structural frame component may be releasably engaged to a bracket, and the structural frame component is permitted to pivot for engagement of the second or distal end and load pins to a connecting plate of another structural frame component.

In at least one alternative embodiment, a structural frame component has two quick release assemblies at opposite ends. The structural frame components may be releasably engaged between the connecting plates of adjacent structural components. The structural frame component having quick release assemblies at opposite ends is permitted to pivot about the connecting plates on one of the adjacent structural components.

In another alternative embodiment, a cam assembly of a structural frame component is releasably and rotatably engaged to a mating bracket which in turn is engaged to a vertical surface. The structural frame component is also pivotally engaged to a connecting plate of another structural frame component.

In at least one additional alternative embodiment, a structural frame component includes a rotatable cam connector and a pair of connecting plates.

In at least one embodiment, a structural frame component includes a rotatable cam connector and more than one pair of connecting plates.

In another alternative embodiment, the load pins form a load pin axis, permitting pivotal movement between structural frame components.

In at least one additional alternative embodiment, structural frame components may be assembled into a stand-alone structures such as a tent, pavilion, walkway, or barrier.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 1 is an isometric perspective view of one alternative embodiment of the releasable connection frame assembly;

FIG. 2 is a detail isometric perspective view of one alternative embodiment of the releasable connection frame assembly;

FIG. 4 is a detail isometric perspective view of a right and left connecting plate of the releasable connection frame assembly;

FIG. 5 is a detail front elevation view of a quick release and second structural support of the releasable connection frame assembly;

FIG. 6 is a detail cross sectional side view taken along the line 6-6 of FIG. 4 of one alternative embodiment of the quick release partially engaged to the right and left connecting plates of the releasable connection frame assembly;

FIG. 7 is a detail cross sectional side view taken along the line 6-6 of FIG. 4 of one alternative embodiment of the quick release aligned for engagement to the right and left connecting plates of the releasable connection frame assembly;

FIG. 8 is a detail cross sectional side view taken along the line 6-6 of FIG. 4 of one alternative embodiment of the quick release fully engaged to the right and left connecting plates of the releasable connection frame assembly;

FIG. 9 is a detail front elevation view of one alternative embodiment of the cam lock and mating bracket of the releasable connection frame assembly;

FIG. 10 is a detail front elevation view of one alternative embodiment of the cam lock partially engaged to the mating bracket of the releasable connection frame assembly;

FIG. 11 is a detail front elevation view of one alternative embodiment of the cam lock fully engaged to the mating bracket of the releasable connection frame assembly;

FIG. 12 is a detail front elevation view of one alternative embodiment of a double connection plate, and one end of the first structural support, central structural support, and second structural support of the releasable connection frame assembly;

FIG. 13 is a detail isometric perspective view of an alternative right and left connecting plate of the releasable connection frame assembly engaged to a vertical surface.

DETAILED DESCRIPTION OF THE PREFERRED EMBODIMENTS

Figure 14:
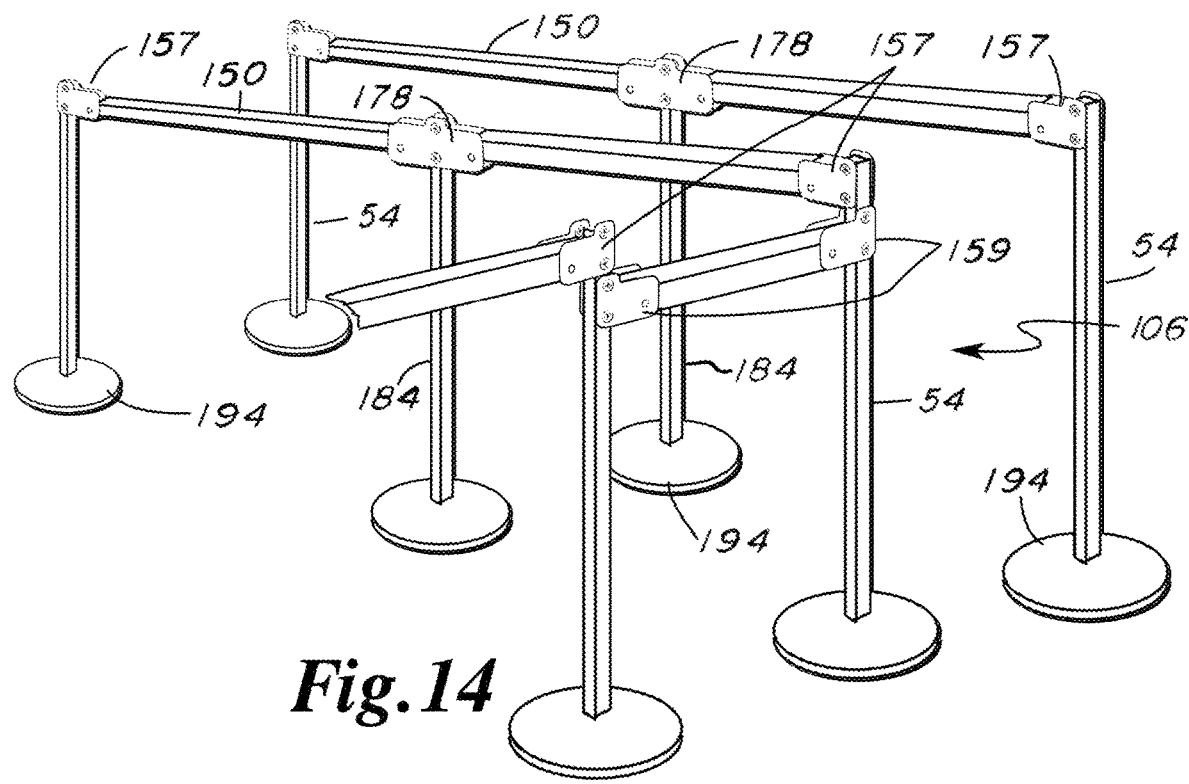
FIG. 14 is an environmental view of one alternative embodiment of the releasable connection frame assembly.

Referring in general to FIGS. 9-11, the cam assembly is referred to by reference numeral 29. In at least one embodiment, the cam assembly 29 may be used to support a removable cover or awning 78 in an operative position to provide shade relative to a vertical or another surface on a structure such as a trailer, wall or other type of structural support 188. The removable cover or awning 78 may be supported in an open operative position through the use of a plurality of mating brackets 48 and tubular frames or structural supports 54.

In a preferred embodiment, one end of a tubular frame or structural support 54 will include a cam lock 30 which releasably engages a mating bracket 48 as affixed to a vertical or another surface. The releasable engagement between the cam lock 30 and the mating bracket 48 significantly simplifies and accelerates the erection or disassembly of the removable cover or awning 78 into an operative shade configuration or to a storage transportation configuration. The use of the cam lock 30 and mating bracket 48 eliminates a need for an individual to transport or use step ladders, step stools, ladders, tools or other equipment in order to secure a structural support 54 to a vertical surface or other type of structural support 188.

In at least one embodiment, the cam lock 30 may be secured to the cam shaft 46 of a mating bracket 48 through rotation, in a manner similar in operation to a one quarter turn fastener. It should be noted that the cam lock 30 may be inserted into the bracket 48 at any relative angle, and may be further twisted or rotated from any angle to lock the cam shaft 46 within the locking groove 64 from any angle. The angular orientation of the cam lock 30 relative to the bracket 48 does not interfere with the positioning of the cam shaft 46 within the spiral twist locking axial slot 44.

In some embodiments, the cam lock 30 includes a spiral twist locking axial slot 44 which may have a chiral geometry for rotation in a clockwise direction for engagement and locking relative to the cam shaft 46. In an alternative embodiment, the cam lock 30 includes a spiral twist locking axial slot 44 which may have an achiral geometry for rotation in a counter-clockwise direction for engagement and locking relative to the cam shaft 46.

In some embodiments, the cam assembly 29 may be secured relative to a vertical or another surface 188 through the use of small and compact self-contained components of the cam lock 30 and mating brackets 48, without the use of tools or external fastening components. The structural supports 54 are preferably used to support a removable cover or awning 78 adjacent to the vertical or outer sides of an enclosed trailer as used during mobile portable temporary events, such as racing, marketing, hospitality, and/or disaster relief to name a few.

In one embodiment, the mating bracket 48 includes a first support 90 and a second support 92. The first support 90 and second support 92 extend normally outwardly from a mating bracket base 94 as secured to a vertical or another surface 188. The distal end of the cam lock 30 is secured to a structural support 54 which may be square tubular in shape through the use of fasteners 66 which may engage tapped holes in the cam lock 30. It should be noted that the structural support 54 may be of any shape as desired and may shaped in a pentagon, hexagon, octagonal, round or any other shape as desired, so long as the structural support 54 is of sufficient strength and durability and is capable of secure engagement to the working end of the cam lock 30. In at least one embodiment, the operational end of the structural support 54 may include the spiral twist locking axial slot 44 where the cam lock 30 is integral with or secured to the structural support 54 by welding or any other type of mechanical or chemical fastening alternative.

In a preferred embodiment, the first support 90 and the second support 92 of the mating bracket 48 are substantially triangular in shape and are parallel relative to each other extending normally outward from the mating bracket base 94. The cam shaft 46 is located between the first support 90 and the second support 92 proximate to the outwardly extending vertices of the mating bracket 48.

In a preferred embodiment, the cam shaft 46 is secured between the first support 90 and the second support 92 by a rigid fastener such as a bolt, screw, or pin. Alternatively, the cam shaft 46 may be permanently affixed or integral to the first support 90 and second support 92 by welding or equivalent mechanical or chemical attachment mechanisms.

Referring in general to FIG. 9, the cam lock 30 is shown being aligned with the mating bracket 48 immediately prior to the engagement of the spiral twist locking axial slot 44 to the cam shaft 46 of the mating bracket 48. As may be seen in FIG. 9 the spiral twist locking axial slot 44 is offset relative to cam shaft 46 by approximately 90 degrees. It should be noted that the spiral twist locking axial slot in other embodiments may be offset relative to the cam shaft 46 by more or less than 90 degrees. The movement of the cam lock 30 towards the cam shaft 46 is represented by arrow 98. It should be noted that the cam lock 30 may be inserted into the mating bracket 48 at any relative angle, and may be further twisted or rotated from any angle to lock the cam shaft 46 within the locking groove 64 from any angle. The angular orientation of the cam lock 30 relative to the mating bracket 48 does not interfere with the positioning of the cam shaft 46 within the spiral twist locking axial slot 44.

In FIG. 9, an individual is standing on a ground surface adjacent to a trailer or other type of vertical surface. The individual is grasping a structural support 54 and is holding the structural support 54 so that the cam lock 30 is elevated towards a mating bracket 48 as adjacent to a roof of a trailer. The individual is grasping the structural support 54 so that an edge or side of the structural support 54 is aligned to the cam shaft 46, and a face of the structural support 54 is offset relative to the cam shaft 46.

FIG. 9 also shows the cam follower 36 as elevated by the spring and engaged to a pair of detents 100. The detents are located and formed between the spiral twist locking axial slot 44 and the locking groove 64. The cam shaft 46 is disposed in the locking groove 64 upon the complete engagement between the cam lock 30 and the mating bracket 48.

As may be seen in FIG. 9 the shaft engagement end 56 of the cam lock 30 may include a chamfered edge to facilitate the positioning of the cam shaft 46 within the spiral twist locking axial slot 44 when the cam lock 30 is moved in the direction of arrow 98 towards the mating bracket 48. The chamfer of the shaft engagement end 56 facilitates the initial insertion or alignment process between the cam shaft 46 and the spiral twist locking axial slot 44. It should be noted that the cam lock 30 may be inserted into the mating bracket 48 at any relative angle, and may be further twisted or rotated from any angle to lock the cam shaft 46 within the locking groove 64 from any angle. The angular orientation of the cam lock 30 relative to the mating bracket 48 does not interfere with the positioning of the cam shaft 46 within the spiral twist locking axial slot 44.

In some embodiments, the mating bracket base 94 may include one or a plurality of affixation apertures 102 which may receive mechanical fasteners to secure the mating bracket 48 to a vertical or another surface.

As may be seen as may be seen in FIG. 10, the shaft engagement end 56 and the spiral twist locking axial slot 44 has been advanced for engagement to the cam shaft 46. The cam lock 30 and the structural support 54 are initially rotationally offset, where an edge of the structural support 54 is in a normal relationship to a horizontal axis of the cam shaft 46. As may be seen in one embodiment, as depicted in FIG. 10, the structural support 54 and cam lock 30 may be rotated in a clockwise direction as represented by arrow 104.

The rotation of the structural support 54 and the cam lock 30 in a clockwise direction advances the cam shaft 46 into the spiral twist locking axial slot 44 towards the internal locking end 62 and locking groove 64. During rotational engagement of the cam lock 30 with the cam shaft 46, the edge of the structural support 54 rotates so that a face of the structural support 54 places the edge of the structural support 54 in the normal position relative to the horizontal cam shaft 46.

As may be seen in FIG. 11, the cam lock 30 has been fully rotated in a clockwise direction to position the cam shaft 46 into the locking groove 64 of the spiral twist locking axial slot 44. In the fully engaged position, the cam shaft 46 depresses the cam follower 36 and 5 compresses the spring moving the cam follower 36 toward the frame engagement end within the central cam groove. In this position the cam follower 36 has been depressed from engagement relative to the detents 100. In a fully engaged position a face of the structural support 54 is aligned with horizontal axis of the cam shaft 46.

It should be noted that the cam lock 30 and structural support 54, in a preferred embodiment, are rotated approximately 90 degrees in a clockwise direction to fully position the cam shaft 46 within the locking groove 64. It should be noted that the rotation of the cam lock 30 and the structural support 54 relative to the cam shaft 46 in some embodiments may be more or less than 90 degrees in order to completely dispose and position the cam shaft 46 within the locking groove 64.

In at least one alternative embodiment, the spiral twist locking axial slot 44 may have an achiral geometry which may be rotated in a counter-clockwise direction of approximately 90 degrees in order to completely dispose and position the cam shaft 46 within the locking groove 64.

Unlocking of the components of the cam assembly 29 is performed in a reverse order of twisting of the cam lock 30 in a reverse direction relative to a mating bracket 48. The reverse twisting of the structural support 54 is required to overcome the spring retention force exerted in the spiral twist locking axial slot 44 by the cam follower 36 upon the cam shaft 46.

The spiral twist locking axial slot 44 provides desired/natural guidance during this process (similar as the insertion process). In at least one embodiment, the insertion and retention forces may be altered by changes to the path of the spiral twist locking axial slot 44, the spring parameters, the cam follower 36 length, or the position or location of the detents 100.

The use of the cam assembly 29 speeds up installation of awnings 78. Assembly or instillation is further enhanced due to the entire fastening structure being incorporated onto a wall, where no separate fastener elements such as screws or bolts or rivets are required.

Further discussion related to the cam assembly 29, cam lock 30 and mating brackets 48 may be found in U.S. patent application Ser. No. 16/439,249 filed Jun. 12, 2019 as incorporated by reference herein in its entirety.

In general referring to FIGS. 1-7 and 12-19 structural supports 54 may be connected to each other to assemble or erect a temporary mobile event frame structure or apparatus such as awning, canopy, or shelter frame.

In at least one embodiment, the length and/or size dimensions of the structural supports 54 may vary. In some embodiments, the length dimension of the structural supports 54 may be equal to or less than eight feet in length. In other embodiments, the length dimension of the structural supports 54 may equal or exceed 14 feet in length. It should be noted that some of the structural supports 54 may be positioned normally relative to a wall or other surface. Alternatively, some of the structural supports 54 may be disposed parallel to a wall or other surface and releasably engaged between other structural supports 54 which are disposed normally relative to a surface.

In at least one embodiment, an awning 78 may then extend outwardly from a vertical wall surface. In alternative embodiments, the structural support 54 may be freestanding to create a pavilion or tent or another type of enclosure having a roof or top.

In some embodiments, the structural supports 54 may be assembled to form a vertical rectangular barricade or barrier, a walkway or path, or a converging entryway for passage to another area 106. The structural supports 54 as described herein may be configured into any alternative combination of structures at the preference of an individual.

In at least one embodiment, the distal end 18 of a structural support 54 opposite to the cam lock 30 will include a quick connector assembly 28. In general the quick connector assembly 28 may be formed of a right connecting plate 14 and a left connecting plate 16. The right connecting plate 14 and left connecting plate 16 in one embodiment are used as a matched pair, which are aligned on opposite sides of the distal end 18 of a structural support 54.

Each of the right and left connecting plates 14, 16 may be formed of sturdy metallic material such as steel, iron or aluminum. Each of the right and left connecting plates 14, 16 will include an aligned pair of affixation apertures 124, 144. Affixation apertures 124, 144 traverse opposite sides of a distal end 18. A fastener may be inserted through each of the aligned affixation apertures traversing the right connecting plate 14, left connecting plate 16, and the distal end 18, in order to secure the right and left connecting plates 14, 16 to a structural support 54.

The right and left connecting plate 14, 16 are preferably mirror or reverse images of each other. The right connecting plate 14 includes a first outer surface 108 which may be flat or which may include a curve as preferred by an individual. The right connecting plate 14 also includes a first inner surface 110 which is flat. Further, the right connecting plate 14 includes a top edge 112 and a bottom 114, a front edge 118, and a back edge 120.

In at least one embodiment, the outward portion of the top edge 112 is defined by an angular chamfer surface 116 which extends from an upper area of the first inner surface 110 outwardly from the interior and upwardly towards the first outer surface 108 establishing the top edge 112.

In at least one embodiment, embodiment, the right connecting plate also includes an alignment guide 58. The alignment guide 58 is generally shaped as an inverted triangle. A load axis aperture 72 traverses the right connecting plate 14 at the lower vertex of the alignment guide 58 towards the bottom 118 and the front edge 118.

In at least one embodiment as depicted in FIG. 4, the right connecting plate 14 includes an attachment area 122. The attachment area 122 has an increased vertical dimension as compared to the first outer surface 108. The interface between the top of the attachment area 122 and the top edge 112 may be curved. The attachment area 122 preferably includes at least two, right plate attachment apertures 124.

In some embodiments, the right connecting plate 14 is substantially rectangular in shape with the exception of the attachment area 122. The bottom 114, and the back edge 120 of the attachment area 122 form a right angle.

In at least one embodiment, the alignment guide 58 is an area which has been cut away and removed from the first inner surface 110 and the angular chamfer surface 116. The alignment guide 58 extends downwardly from the angular chamfer surface 116 towards the lower vertex to a location proximate to the front edge 118 and the bottom 114. The cut away surface of the alignment guide 58 has a sufficient depth to function as a positioning guide for the load retention pins 24. The load retention pins 24 releasably engage the load axis apertures 72, which in the coupled position are pressed outwardly through the load axis apertures 72 of the right connecting plates 14. The load retention pins 24 also extends outwardly through, and are releasably engaged to, the load pin apertures 160 of the structural supports 54. The brace structural supports 156 or horizontal structural supports 150 may also include load pin apertures 160 and load retention pins 24.

In at least one alternative embodiment, the descending guide edges 126 of the alignment guide 58 form an angular guide wall having descending guide edges 126.

In some embodiments, a release pin 26 releasably engages the release pin aperture 162, passing outwardly therefrom, in the connected operational position. The release pin 26 may be depressed inwardly for retraction of the load retention pin 24 from the load pin aperture 160 and load axis aperture 72, releasing the structural support 54, horizontal structural support 150 or brace structural support 156 from a connected operational configuration to a released configuration relative to a right and left connecting plate 14, 16.

In some embodiments the left connecting plate 16 includes a second outer surface 128 which may be flat or which may include a curve as preferred by an individual. The left connecting plate 16 also includes a second inner surface 130 which is flat. Further, the left connecting plate 16 includes a second top edge 132, a second bottom edge 134, a second front edge 136 and a second back edge 138.

In some embodiments, the second top edge 132 is defined by a second angular chamfer surface 140, which extends from an upper area of the interior portion of the second inner surface 130 outwardly and upwardly towards the second outer surface 128 defining the second top edge 132.

In at least one embodiment, the second inner surface 130 also includes an alignment guide 58. The alignment guide 58 is generally shaped as an inverted triangle. A load axis aperture 72 traverses the left connecting plate 16 at the lower vertex of the alignment guide 58 towards the second bottom edge 134 and the second front edge 136.

In an alternative embodiment, the left connecting plate 16 includes a second attachment area 142. The second attachment area 142 has an increased vertical dimension as compared to the second outer surface 128. The interface between the second top edge 132 between the second attachment area 142 and the top of the second outer surface 128 may be curved. The second attachment area 142 preferably includes at least two, left plate attachment apertures 144.

In some embodiments, the left connecting plate 16 is substantially rectangular in shape with the exception of the second attachment area 142. The second bottom edge 134 and the second back edge 138 form a right angle. The second attachment area 142 has an increased vertical dimension, relative to the second top edge 132.

In at least one embodiment, an alignment guide 58 has been cut away and removed from the second inner surface 130 and the second angular chamfer surface 140. The alignment guide 58 extends downwardly from the second angular chamfer surface 140 to a location proximate to the vertex between the second front edge 136 and the second bottom edge 134. The alignment guide 58 has a sufficient depth to funnel the load retention pin 24 towards the load pin aperture 72. The load retention pin 24 releasably engages the load axis aperture 72. In the coupled position the load retention pin is pressed outwardly through the load axis aperture 72 and the load pin aperture 160 of the structural support 54. The horizontal structural support 150 or brace structural support 156 may also include load retention pins 24, load axis apertures 72 as well as load pin apertures 160.

In at least one embodiment, the descending angular guide edges 126 form a straight guide wall for the load retention pins 24.

In general, referring to FIG. 1, an upper pair 152 and a lower pair 154 of mating brackets 48 are secured to a vertical wall surface which may be the exterior surface of a trailer, building, or other structural support 188. A structural support 54 having a cam assembly 29 is engaged to each upper pair 152 of mating brackets 48 as earlier described.

At the opposite or distal end 18 a right and left connecting plate 14, 16 may be secured to opposite sides on the top and bottom surfaces of a structural support 54, through the use of support fasteners 146. Support fasteners 146 pass through support fastener apertures 148. The support fastener apertures 148 are preferably aligned between the right and left plate attachment apertures 124, 144.

In some embodiments, at a location between the cam assembly 29 and the distal end 18, an intermediate pair 158 of a right and left connecting plates 14, 16, may be secured to a structural support 54. The intermediate pair 158 of right and left connecting plates 14, 16 are secured to the left and right surfaces of the structural support 54. The intermediate pair 158 of right and left connecting plates 14, 16 are positioned 90 degrees or normally relative to the direction of positioning of the right and left connecting plates 14, 16 as attached to the opposite or distal end 18 of the structural support 54.

In at least one embodiment, the right and left connecting plates 14, 16 at the distal end 18 are aligned for receipt of a horizontal structural support 150. The horizontal structural support 150 is in a plane parallel to a wall or other vertical surface.

A number of structural supports 54 of FIG. 1 extend normally and outwardly relative to a wall or other surface and function as an upper support for a removable awning 78.

As shown in FIG. 1 the back edge 120 and the second back edge 138 of the right and left connecting plates 14, 16 respectively are aligned with the exterior surface of the top, and bottom surfaces of structural support 54. In this embodiment the right and left connecting plates 14, 16 are disposed in a direction facing another structural support 54 (as shown facing to the right). Likewise, the back edge 120 and the second back edge 138 of the right and left connecting plates 14, 16 are aligned with the exterior surface of the top, and bottom surfaces of the other structural support 54. In this embodiment the right and left connecting plates 14, 16 are disposed in a direction facing the initially referenced structural support 54 (as shown facing to the left).

In at least one embodiment, the intermediate pair 158 of right and left connecting plates 14, 16 are secured to the structural support 54, and extend downwardly therefrom. The intermediate pair 158 facilitate the positioning of a brace structural support 156 into an engaged operative position relative to the structural support 54. As shown in FIG. 1 the back edge 120 and the second back edge 138 of the intermediate pair 158 are aligned with a right edge and a left edge of a structural support 54 and extend downwardly relative thereto. The intermediate pair 158 of right and left connecting plates 14, 16 are secured to the structural support 54 through the use of support fasteners 146 and support fastener apertures 148 as earlier described. The intermediate pair 158 may be located any desired distance from either the cam assembly 29 of the distal end 18 of the structural support 54 depending on the application.

In at least one embodiment, a brace structural support 156 is releasably connected to each of the lower pair 154 of mating brackets 48 through the cam assemblies 29 as earlier described.

The brace structural supports 156 are preferably shorter in length as compared to the structural supports 54 as shown in FIG. 1. The brace structural supports 156 function as quick release load bearing braces for support the structural supports 54 in an operative position when supporting an awning 78 during use.

Each of the brace structural supports 156 at the distal end 18 include a quick release assembly 38. Each quick release assembly 38 includes a compression spring 60 which is formed of metal material in the shape of an elongate "U" having extended prongs 170. Each prong 170 preferably includes an outwardly extending load retention pin 24 and an outwardly extending release pin 26. In an assembled operative position, each load retention pin 24 is placed for releasable coupling within a load axis aperture 72. Each load retention pin 24 is positioned in and traverses an aligned load pin aperture 160 through a distal end 18 of a brace structural support 156.

Each release pin 26 is placed for releasable positioning relative to a release pin aperture 162. Each release pin 26 is located, and traverses, an aligned release pin aperture 162 through the distal end 18 of a brace structural support 156.

In at least one embodiment, in an operative assembled configuration, the release pins 26 are exterior relative to, and do not engage, the right and left connecting plates 14, 16 respectively.

In the operative assembled configuration the load retention pins 24 extend from the interior of a structural support 54, horizontal structural support 150 or brace structural support 156 outwardly, passing through a load pin aperture 160, alignment guide 58 and load axis aperture 72, establishing a rotational axis relative to a right and left connecting plate 14, 16.

During use the rotational axis is preferably substantially perpendicular or normal relative to a vertical wall surface.

Following engagement of the cam assembly 29 of a structural support 54, or brace structural support 156, to a mating bracket 48, a rotational axis is established about the cam shaft 46 which is substantially perpendicular or normal relative to a wall surface.

In at least one embodiment, in an operative connected position, the load retention pins 24 of a horizontal structural support 150 as engaged to a right and left connecting plate 14, 16, establish a rotational axis which is normal with respect to a wall or other surface.

In at least one embodiment, a "C" bracket having a "C" channel 164 is secured to a wall, other surface, or other structure above the upper pairs 152 of mating brackets 48. The bracket with "C" channel 164 is used to releasably secure an awning 78 as an anchor, permitting the remainder of the awning 78 to be drawn over the structural supports 54 and horizontal structural supports 150 in an operative configuration. The bracket with "C" channel 164 preferably slidably receives a cylindrical edge of an awning 78 during attachment of an awning 78 to a frame assembly.

In at least one embodiment, the intermediate pair 158 of right and left connecting plates 14, 16 are preferably at an angle of 90 degrees relative to the direction of the quick connector assembly 28 at the distal end 18 of a structural support 54.

In another embodiment, the quick release assembly 38 of the brace structural support 156 releasably engages the intermediate pair 158 of the right and left connecting plates 14, 16 to function as a load bearing brace for the awning support frame during use of an awning 78.

In another embodiment, each horizontal structural support 150 has a quick release assembly 38 at each of the opposite ends. The quick release assembly 38 of the horizontal structural support 150, on each opposite end, may be releasably engaged to a right and left connecting plate 14, 16 as engaged to the distal end 18 of a structural support 54.

As may be seen with reference to FIG. 1, at least two structural supports 54, at least two brace structural supports 156, and at least one horizontal structural support 150 are releasably connected together to form a section or a frame for an awning 78 in an operative configuration.

It should be noted that any of the structural supports 54, brace structural supports 156, horizontal structural supports 150 or central supports 184 may include any combination of a single cam assembly 29, single or multiple quick connector assemblies 28, and/or double connection plates 178, and/or quick release assemblies 38 as required by a particular application. In addition, the structural supports 54, brace structural supports 156, horizontal structural supports 150 or central supports 184, may individually or in any combination, include any number of intermediate pairs 158 of quick connector assemblies 28 or double connecting plates 178 as desired for a particular application.

The location for the cam assemblies 29, quick connector assemblies 28, and/or double connection plates 178, and/or quick release assemblies 38 have been provided for illustrative purposes and are not intended to be limiting as to the location, number or combinations relative to each other on a structural support 54, brace structural support 156, horizontal structural support 150 or central support 184 as identified herein. In addition, any structural support 54, brace structural support 156, horizontal structural support 150 or central support 184 may include any aligned, adjacent or offset number of upper 157, lower 159 or intermediate 158 pairs of quick connector assemblies 28, or double connecting plates 178 at any location as desired for a particular application.

Any coupling of a quick release assembly 38 to a quick connector assembly 28 may occur from above, below or at any other direction as desired for a particular application. Further, any quick connector assembly 28 or double connecting plates 178 may be disposed in 5 any desired direction relative to a structural support 54, brace structural support 156, horizontal structural support 150 or central support 184 as required for a particular application.

As may be seen in FIG. 2, in one embodiment, a horizontal structural support 150 is shown immediately prior to engagement to a right and left connecting plate 14, 16. As depicted in FIG. 2, an individual is not required to depress the release pins 26 prior to engagement of the load retention pins 24 into the alignment guides 58 of the right and left connecting plates 14, 16. An individual may position one end of the horizontal structural support 150 above the right and left connecting plates 14, 16 and may then move the end of the horizontal structural support 150 downwardly toward the alignment guides 58 as depicted by arrow 166. The downward force on the end of the horizontal structural support 150 causes the load retention pins 24 to contract the alignment guides 58, and to load the compression spring 60. The load retention pins 24 also retract in the load pin apertures 160.

The load retention pins 24 if necessary will contact the descending guide edges 126 for directed movement downwardly towards the load axis aperture 72. Movement in a downward direction aligns and positions the load retention pins 24 above the load axis aperture 72. Upon alignment between the load retention pins 24 and the load axis aperture 72 the compression spring 60 within the interior of horizontal structural support 150 expands forcing the load retention pins 24 to move outwardly relative to load pin apertures 160 and into the load axis apertures 72. The descending guide edges 126 on the opposite sides of the alignment guides 58 function as a funnel to direct the load retention pins 24 downwardly for aligned positioning above a respective load axis aperture 72. Proper alignment between a horizontal structural support 150 with respect to a right and left connecting plate 14, 16 will then automatically occur.

In at least one alternative embodiment, the engagement of one end of a horizontal structural support 150 to a right and left connecting plate 14, 16 establishes a pivot axis at the load axis apertures 72. An opposite end of a horizontal structural support 150 may be elevated or rotated downwardly for engagement to another pair of right and left connecting plates 14, 16 on another structural support 54. In this position the release pins 26 are exterior with respect to, and are not engaged to a right connecting plate 14 or left connecting plate 16.

In at least one embodiment as depicted in FIG. 5, one end of a horizontal structural support 150, or the distal end 18 of a structural support 54, or brace structural support 156 is shown. In this embodiment and end cap 40, having chamfered edges 50 is shown. In this embodiment, an interior stop 42 is shown in phantom line. An end cap fastener 52 connects the end cap 40 to the end of a structural support 54, brace structural support 156 or horizontal structural support 150.

In some embodiments, the compression spring 60 is disposed within one or both ends of a horizontal structural support 150, or a distal end 18 of a structural support 54 or brace structural support 156, and is shown in detail in FIG. 6 through FIG. 8. As may be seen in FIG. 6, the quick release assembly 38 is shown immediately prior to engagement to a right and left connecting plate 14, 16. In this embodiment, the load retention pins 24 are being forced inwardly and into engagement with the alignment guides 58 of a right and left connecting plate 14, 16 when moved downwardly and inwardly in the direction of arrow 168. The load retention pins 24 make contact with the alignment guides 58 of the right and left connecting plates 14, 16 which compress the prongs 170 in a direction towards each other. Simultaneously, the load retention pins 24 are retracted inwardly relative to the load pin apertures 160. The depth of the alignment guide 58 is not sufficient to permit the load retention pins 24 to become fully retracted within load pin apertures 160. Undesirable or binding between the load retention pins 24 within the load pin apertures 160 is thereby prevented.

As may be seen in FIG. 6, the end cap 40 includes an interior stop 42 which is preferably integral to the interior or rear face of the end cap 40. The end cap 40 and interior stop 42 are preferably formed of metal material. The interior stop 42 functions to restrict the movement or depression of the release pins 26 within the release pin apertures 162, and the depression of the load retention pins 24 within the load pin apertures 160, preventing binding of the load retention pins 24 within the load pin apertures 160.

In some embodiments, the interior stop 42 includes an end cap attachment aperture 172. The end cap attachment aperture 172 receives an end cap fastener 52. The end cap fastener 52 passes through end cap attachment hole 176 which is aligned with, and which pass through, a structural support 54, brace structural support 156 or horizontal structural support 150.

In one embodiment, the exterior stop edges 174 function as compression limiters and positioning restrictions for the prongs 170.

As a structural support 54, brace structural support 156 or horizontal structural support 150 is moved in a downward and forward direction identified by arrow 168 of FIG. 6, the load retention pins 24 will contact and slide along the alignment guides 58 and descending guide edges 126. Additional compression of the prongs 170 may occur during the passage of the load retention pins 24 past the alignment guides 58 and descending guide edges 126.

Alignment of the load retention pins 24 with the load axis apertures 72 permits expansion of the prongs 170 forcing the load retention pins 24 outwardly relative to the load pin apertures 160 into the load axis apertures 72. The outward engagement of the load retention pins 24 within the load axis apertures 72 defines the operative engagement position of a structural support 54, brace structural support 156 or horizontal structural support 150 relative to a right and left connecting plate 14, 16.

In the operative engaged position the release pins 26 and release pin apertures 162 are located exterior to the respective right connecting plate 14 and left connecting plate 16. In order to release a structural support 54, brace structural support 156 or a horizontal structural support 150 for a right and left connecting plate 14, 16 the release pins 26 may be compressed within the release pin apertures 162. Inward pressure on the release pins 162 will retract the load retention pins 24 inwardly from the load axis apertures 72 permitting a structural support 54, brace structural support 156 or a horizontal structural support 150 be moved in a direction opposite to arrow 168 during separation of a quick release assembly 38 from a quick connector assembly 28.

In a preferred embodiment, in order to couple a structural support 54, brace structural support 156 or horizontal structural support 150 to a right and left connecting plate 14, 16, an individual does not compress the release pins 26 in order to retract the prongs 170 and load retention pins 24 inwardly. In this embodiment an individual exerts a downward force on a distal end 18 of a structural support 54, or brace structural support 156, or an end of a horizontal structural support 150 as disposed proximate to the outwardly extending right and left connecting plates 14, 16. The downward force of the distal end 18 of a structural support 54, brace structural support 156 or horizontal structural support 150 causes the load retention pins 24 to become engaged to the alignment guides 58 compressing the load retention pins 24 within the load pin apertures 160. Additional downward force on the distal end 18 automatically guides the load retention pins 24 into alignment with the load axis aperture 72, permitting the positioning and engagement of the load retention pins 24 within the load axis aperture 72.

In an initial engaged position, the opposite end of a structural support 54, brace structural support 156 and/or horizontal structural support 150 may be located in a pre-engaged position relative to another right and left connecting plate 14, 16. In the pre-engaged position of the opposite end of a structural support 54, brace structural support 156 or a horizontal structural support 150 may be pivoted about the axis of rotation, where the opposite end may be forced in a downward arc for engagement of the load retention pins 24 within the alignment guides 58 for positioning of the load retention pins 24 into the load axis apertures 72 of another right and left connecting plate 14, 16.

In at least one embodiment, the back edge 120 and the second back edge 138 are aligned and are flush with respect to a common surface of a rectangular structural support 54, brace structural support 156, horizontal structural support 150 or a central support 184. In this embodiment the size of the width dimension for the attachment area 122 and the second attachment area 142 is sufficiently wide, and/or may be equal to, the dimension of an adjacent surface which is perpendicular to the common surface of the structural support 54, brace structural support 156, horizontal structural support 150 or a central support 184. The width dimension for the attachment area 122 and the second attachment area 142 may be either larger or smaller than the width dimension selected for an adjacent surface of a structural support 54, brace structural support 156, horizontal structural support 150 or a central support 184. The width dimension for the attachment area 122 and the second attachment area 142 is preferably sufficiently large to support the structural engagement of the right and left connecting plates 14, 16 to the adjacent surfaces without fracture or failure during the support of an awning 78.

In at least one embodiment the first outer surface 108 and the second outer surface 128 of the right and left connecting plates 14, 16 extend outwardly from adjacent surfaces of the structural support 54, brace structural support 156, horizontal structural support 150 or a central support 184. The alignment guides 58 are opposite to the first outer surface 108 and the second outer surface 128. The size dimension for the first outer surface 108 and the second outer surface 128 may vary, and the size dimensions for the alignment guides 58 may vary depending on the requirements of a particular application.

In some embodiments, the right and left connecting plates 14, 16 have a width dimension being equal to or greater than 1½ inches and equal to or less than 5 inches, a length dimension being equal to or greater than 1½ inches and equal to or less than 5 inches, and a thickness dimension being equal to or greater than V % inch and equal to or less than 2½ inches. In one embodiment the right and left connecting plates 14, 16 have a width dimension being equal to 2½ inches, a length dimension being equal to 2.43 inches, and a thickness dimension being equal to 1.1 inches. In another embodiment right and left connecting plates 14, 16 have a width dimension being equal to 2½ inches, a length dimension being equal to 3.3 inches, and a thickness dimension being equal to 0.365 inches. In a further embodiment right and left connecting plates 14, 16 have a width dimension being equal to 2 inches, a length dimension being equal to 2½ inches, and a thickness dimension being equal to 0.375 inches.

In some embodiments, the structural supports 54, brace structural supports 156, horizontal structural supports 150 and/or central supports 184 are square tubular in shape, rectangular tubular in shape or cylindrical tubular in shape. In some embodiments, the structural supports 54, brace structural supports 156, horizontal structural supports 150 and/or central supports 184 formed in the shape of a square or rectangular tube have a width dimension being equal to or greater than ½ inch and equal to or less than 5 inches, and a height dimension being equal to or greater than ½ inch and equal to or less than 5 inches. In at least one embodiment the structural supports 54, brace structural supports 156, horizontal structural supports 150 and/or central supports 184 formed in the shape of a square tube have a width and height dimension being equal to 1½ inch. In at least one embodiment, the structural supports 54, brace structural supports 156, horizontal structural supports 150 and/or central supports 184 formed in the shape of a rectangular tube have a width dimension being equal to 3 inches and a height dimension being equal to 1½ inch. In at least one embodiment, the structural supports 54, brace structural supports 156, horizontal structural supports 150 and/or central supports 184 are formed in the shape of a cylindrical tube having a diameter dimension being equal to or greater than 2 inch and equal to or less than 4 inches.

In one alternative embodiment as shown in FIGS. 12 and 14, a right and left connecting plate 14, 16 have been joined together, and extend outwardly from the respective attachment areas 122, 142, to form a double connecting plate 178. The double connecting plate 178 may be generally "T" shaped.

In this embodiment a right connecting plate 14 and a left connecting plate 16 will be a unitary component, extending outwardly from a common central area. One double connecting plate 178 will be engaged to each of the opposite sides of a structural support 54, brace structural support 156, horizontal structural support 150 or a central support 184.

Referring to FIG. 14 the central support 184 at the top has a visible double connecting plate 178. The portion of the visible double connecting plate 178 extending to the right, on the inside, will include the elements, features, attributes and functions as earlier described for an alignment guide 58 of a left connecting plate 16. Also the portion of the visible double connecting plate 178 extending to the left, on the inside, will include the elements, features, attributes and functions as earlier described for an alignment guide 58 of a right connecting plate 14.

A second double connecting plate 178 will be engaged to the top of the central support 184 opposite to and aligned with the visible double connecting plate 178. The alignment guides 58 of the second double connecting plate 178 will face to the interior, towards the alignment guides 58 of the visible double connecting plate 178.

From the same perspective from the front, the portion of the second double connecting plate 178 extending to the right, on the inside, will include the elements, features, attributes and functions as earlier described for an alignment guide 58 of a right connecting plate 14. Also the portion of the second double connecting plate 178 extending to the left, on the inside, will include the elements, features, attributes and functions as earlier described for an alignment guide 58 of a left connecting plate 16.

It should be noted that the interior of a right connecting plate 14 and alignment guide 58 will always be facing the interior of a left connecting plate 16 and alignment guide 58. Likewise, during the use of two double connecting plates 178 the interior of one side of a double connecting plate 178 will include the earlier described elements, features, attributes and functions of a left connecting plate 16 and alignment guide 58 facing the interior portion of one side of a second double connecting plate 178 having the elements, features, attributes and functions of a right connecting plate 14 and alignment guide 58. In addition, the interior of the opposite side of a double connecting plate 178 will include the earlier described elements, features, attributes and functions of a fight connecting plate 14 and alignment guide 58 facing the interior portion of the opposite side of a second double connecting plate 178 having the elements, features, attributes and functions of a left connecting plate 16 and alignment guide 58.

As shown in FIG. 12, the distal ends 18 and quick release assemblies 38 of a structural support 54, brace structural support 156 or a horizontal structural support 150 are moved in the direction of arrow 180 for releasable attachment of a load retention pin 24 within a load axis aperture 72 as earlier described. In this embodiment, the two opposite and exterior structural support 54, brace structural supports 156 and/or horizontal structural support 150 in any combination may be rotated about an axis of rotation between the load retention pins 24 and load axis aperture 72, in the direction of arrow 182, enabling the exterior structural supports 54, brace structural supports 156 and/or horizontal structural supports 150 to be horizontally aligned relative to a double connecting plate 178, in a horizontal or vertical direction as may be seen in FIG. 3 and FIG. 14.

In one embodiment, the attachment area 122 of the double connecting plate 178 is sufficiently large in dimension to receive a central support 184. The central support 184 may be releasably secured to the double connecting plate 178 through the use of aligned affixation apertures and fasteners traversing between the double connecting plate 178 and central support 184.

In one embodiment as shown in FIG. 13, a right connecting plate 14 and left connecting plate 16 may be integral with end wall 186. The end wall 186 may be secured to any sturdy vertical surface such as a wall, post or other type of structural support 188. The remaining features of right connecting plate 14 and left connecting plate 16 as earlier described are applicable with respect to the embodiment where the right and left connecting plate 14, 16 include the end wall 186. The end wall 186 may be secured to another type structural support 188 through the use of end wall fasteners 190, which pass through end wall attachment apertures 192.

It should be noted that in all embodiments described herein that right and left connecting plates 14, 16 are substantially parallel relative to each other.

As may be seen in an alternative embodiment as depicted in FIG. 14, a walkway or other defined area 106 has been established through the use of a plurality of structural supports 54, brace structural supports 156 and/or horizontal structural supports 150 as joined together by right and left connecting plates 14, 16 and/or double connecting plates 178. As may be seen in FIG. 14, one end of a structural support 54, brace structural support 156, horizontal structural support 150 and/or central support 184 will be vertically secured to a base 194. Opposite to the base 194, a right and left connecting plate 14, 16, or a pair of double connecting plates 178, may be secured to the top of a structural support 54, brace structural support 156, horizontal structural support 150 or central support 184. Generally, a horizontal structural support 150 will extend between adjacent structural supports 54.

As may be seen in FIG. 14, a central support 184 having a pair of double connecting plates 178 may be disposed between structural supports 54. It should be noted that any desired number of central supports 184 having a top pair of double connecting plates 178 may be positioned adjacent to each other depending on the desired length dimension of the defined area 106.

In most embodiments, horizontal structural supports 150 extend between adjacent pairs of central supports 184 and double connecting plates 178. In addition, horizontal structural supports 150 may extend between an adjacent central support 184 having a pair of double connecting plates 178 and a vertical structural support 54 having a right and left connecting plate 14, 16.

Figure 15:
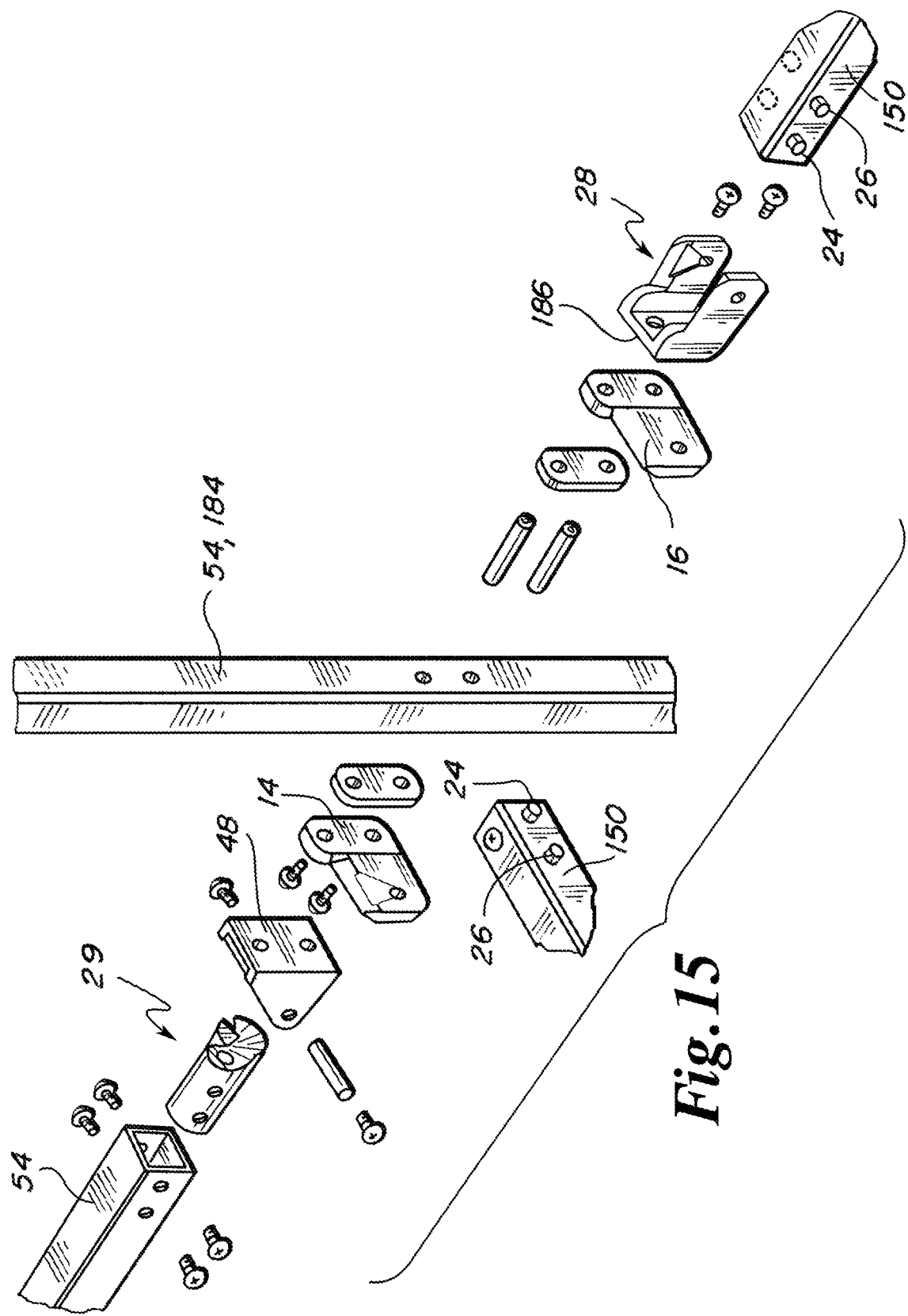
FIG. 15 is an exploded isometric perspective view of one alternative embodiment of an upper portion of a releasable connection frame assembly.

As may be seen in an alternative embodiment as depicted in FIG. 15, a vertical structural support 54 or central support 184 may include an interior right and left connecting plate 14, 16, having the elements, features, attributes and functions as earlier described. A mating bracket 48 may be attached to the exterior of a right connecting plate 14 through the use of mechanical fasteners. Alternatively the mating bracket 48 may be attached to the exterior of a left connecting plate 16 as required in a particular application. A structural support 54 having a cam assembly 29 may be releasably attached to the mating bracket 48 as earlier described.

Continuing to refer to FIG. 15 a quick connector assembly 28, as depicted in FIG. 13, having an end wall 186, may be secured to the exterior of the left connecting plate 16. The direction of the quick connector assembly 28, as exterior to the left connecting plate 16, will be positioned perpendicular to the direction of the left connecting plate 16. In an alternative embodiment the quick connector assembly 28 may be attached to the exterior of the right connecting plate 14 as required in a particular application. The quick connector assembly 28 will have the elements, features, attributes and functions as earlier described.

The releasable engagement of a horizontal structural support 150 to the quick connector assembly 28, as exterior to the left connecting plate 16, will be identical to the coupling as earlier described. Another horizontal structural support 150 will be releasably engaged to the right and left connecting plates 14, 16 as earlier described.

In the embodiment as shown in FIG. 15 mechanical fasteners will pass through the end wall 186 of the quick connector assembly 28, the left connecting plate 16, the vertical structural support 54 or central support 184, the right connecting plate 14, and the mating bracket 48. This configuration would establish a three dimensional corner formed along an "X", "Y", and "Z" axis by a middle horizontal structural support 150, a left horizontal structural support 150 coupled to the left connecting plate 16 and a right horizontal structural support 150 having a cam assembly 29 coupled to a right connecting plate 14.

Figure 16:
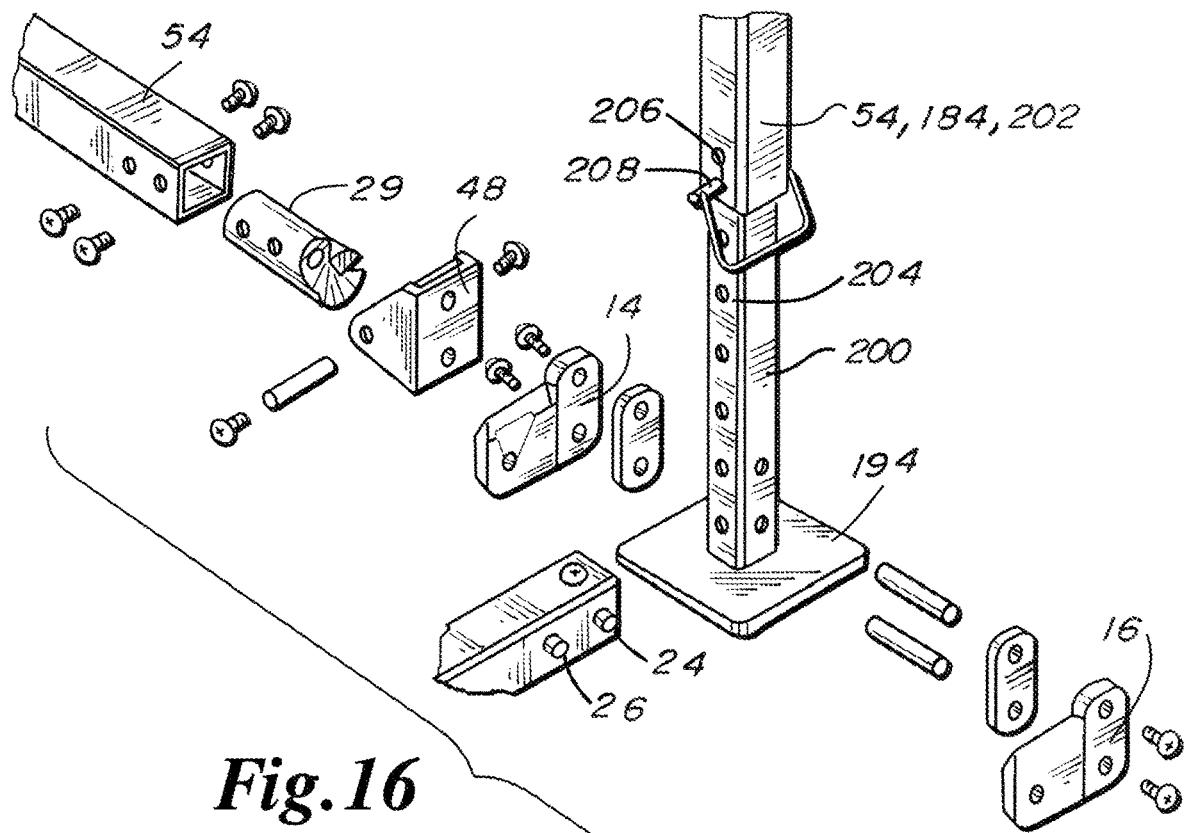
FIG. 16 is an exploded isometric perspective view of one alternative embodiment of a lower portion of a releasable connection frame assembly.
Figure 17:
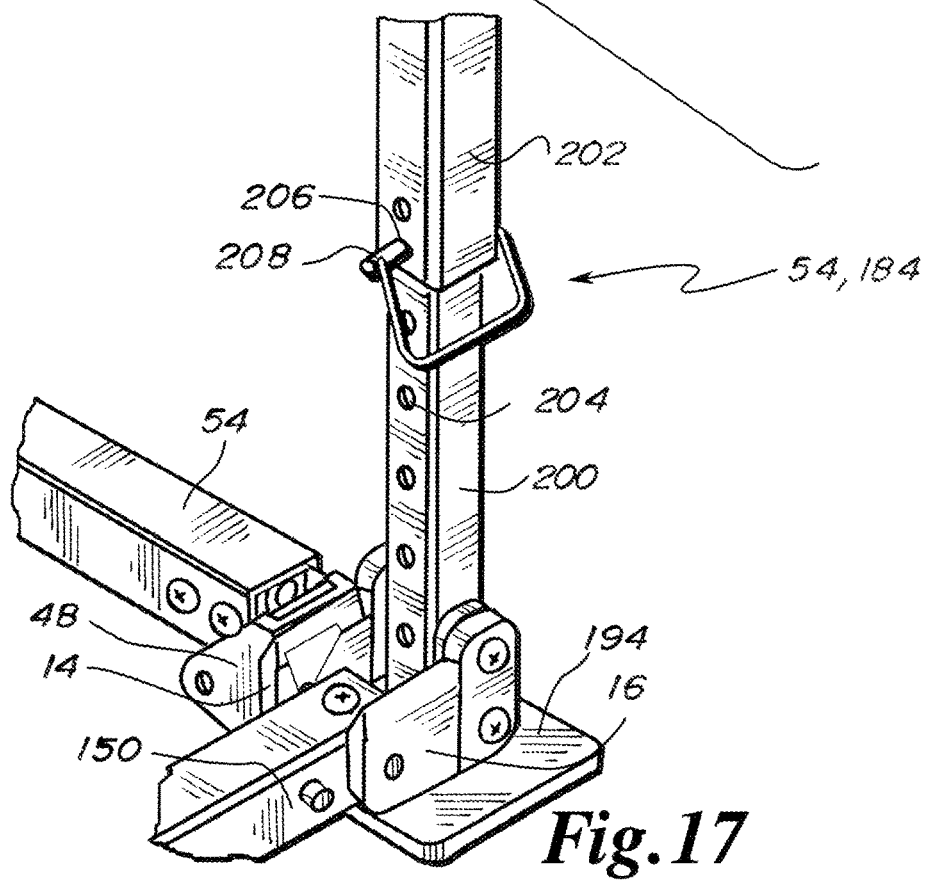
FIG. 17 is a detail isometric perspective view of one alternative embodiment of a lower portion of a releasable connection frame assembly.

In an alternative embodiment as shown in FIGS. 16 and 17, a vertical structural support 54 or central support 184 is engaged to a base 194. A right structural support 54 having a cam assembly 29 and a mating bracket 48 is shown releasably engaged to the right connecting plate 14 as previously shown in FIG. 15. A horizontal structural support 150 is releasably coupled to the right and left connecting plates 14, 16 as earlier described.

In the embodiment of FIGS. 16 and 17 the mating bracket 48, and the right and left connecting plates 14, 16, are located proximate to the base 194 and are perpendicular relative to each other. The mating bracket 48 and the right and left connecting plates 14, 16, may alternatively be elevated any desired distance above the base 194 as required for a particular application.

In the embodiment of FIGS. 16 and 17 the vertical structural support 54 or central support 184 may be formed of a first telescoping structure 200 disposed within a second telescoping structure 202. The height of a structure in a particular application may be adjusted through the use of telescoping height apertures 204, telescoping attachment apertures 206, and an adjustable and releasable pin 208.

In the embodiment of FIGS. 16 and 17, a horizontal structural support 150 will be releasably engaged to the right and left connecting plates 14, 16 as earlier described. The horizontal structural support 150 will be perpendicular to the structural support 54.

In the embodiment as shown in FIGS. 16 and 17 mechanical fasteners will pass through the left connecting plate 16, the vertical structural support 54 or central support 184, the right connecting plate 14, and the mating bracket 48. This configuration would establish a three dimensional corner having a middle horizontal structural support 150 extending outwardly from the right and left connecting plates 14, 16, and a right structural support 54 having a cam assembly 29 coupled to the right connecting plate 14.

Figure 18:
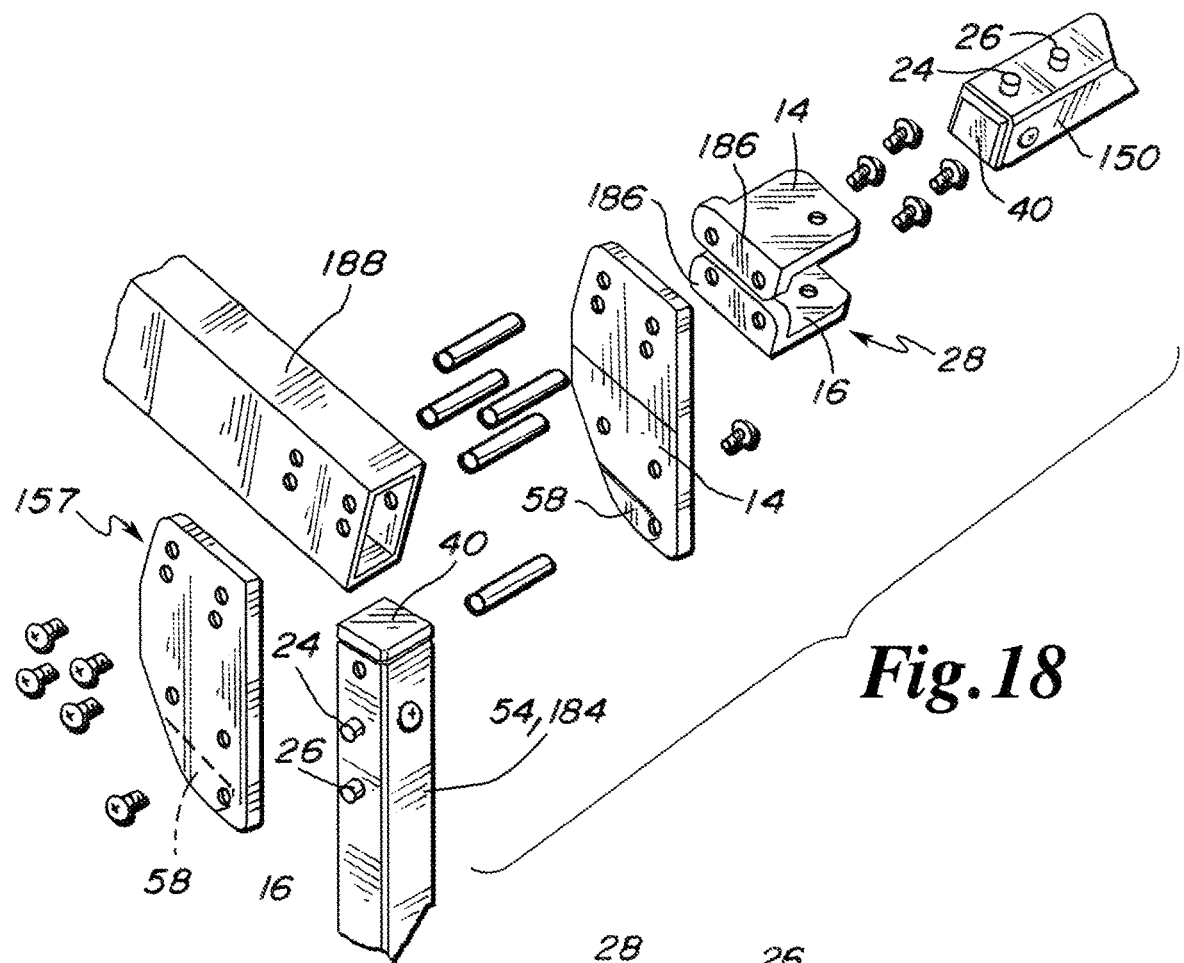
FIG. 18 is an exploded isometric perspective view of one alternative embodiment of an upper corner of a releasable connection frame assembly.
Figure 19:
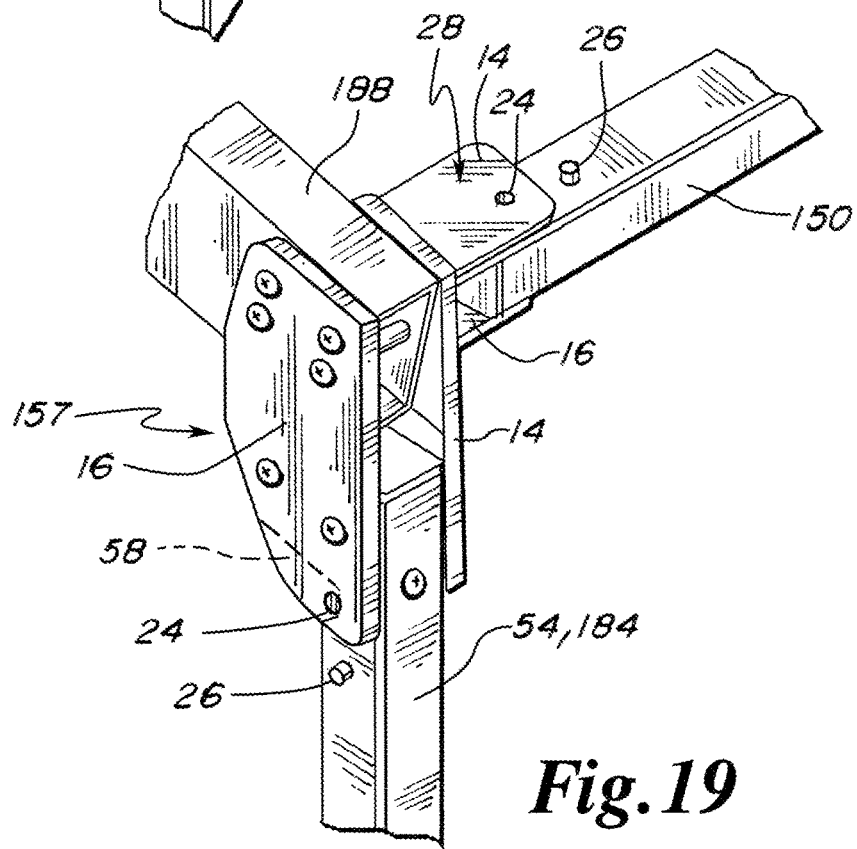
FIG. 19 is a detail isometric perspective view of one alternative embodiment of an upper corner of a releasable connection frame assembly.

As may be seen in FIGS. 18 and 19, a corner for a support structure may be established through the use of a vertical structural support 54 or central support 184, having an upper pair 157 of right and left connecting plates 14, 16 secured thereto.

As shown in FIGS. 18 and 19, a quick connector assembly 28, formed of a right and left connecting plate 14, 16, is attached to the exterior of the upper portion of the right connecting plate 14 which in turn is attached to the vertical structural support 54 or central support 184. Alternatively, a quick connector assembly 28 as shown in FIG. 13 may be engaged to the exterior of the upper portion of the right connecting plate 14 attached to the vertical structural support 54 or central support 184.

In the alternative embodiment as shown in FIG. 18 and FIG. 19, the right and left connecting plates 14, 16, of the quick connector assembly 28 each have an end wall 186 which may be secured to the exterior of either the upper portion of the right or left connecting plates 14, 16, which in turn are attached to the vertical structural support 54 or central support 184. In this embodiment the end wall 186 of the quick connector assembly 28 of FIG. 13 has been cut vertically at the center to form independent right and left connecting plates 14, 16.

In FIGS. 18 and 19 the quick connector assembly 28 is shown engaged to the exterior of the right connecting plate 14. The direction of the quick connector assembly 28 to exterior to the right connecting plate 14 will be perpendicular to the direction of right and left connecting plates 14, 16 as secured to the vertical structural support 54 or central support 184.

As shown in FIGS. 18 and 19, the right and left connecting plates 14, 16 have a revised shape as compared to the embodiments depicted in FIGS. 1-3, and 12-16. In FIGS. 18 and 19 the right and left connecting plates 14, 16 have an upper section which is secured to another type of structural support 188 through the use of mechanical fasteners. The right and left connecting plates 14, 16 have a lower section having the interior features of the alignment guides 58 and load axis apertures 72 as earlier described. The engagement of a vertical structural support 54 or central support 184 to the right and left connecting plates 14, 16, alignment guides 58, and load axis apertures 72 will be identical to the coupling as earlier described herein.

A horizontal structural support 150 may be releasably engaged to the quick connector assembly 28, as exterior to the upper portion of the right connecting plate 14. A vertical structural support 54 or central support 184 may be releasably engaged to the lower portion of the right and left connecting plates 14, 16 as earlier described. A supplemental support 188 may be secured to the upper portion of the right and left connecting plates 14, 16 through the use of mechanical fasteners.

In the embodiment as shown in FIGS. 18 and 19 mechanical fasteners will pass through the end walls 186 of the quick connector assembly 28, the upper section of the right connecting plate 14, the other structural support 188, and the left connecting plate 16.

In an alternative embodiment, a vertical structural support 54 and/or central support 184 may be attached to a "T" shaped quick connector assembly 28 having a right and left connecting plate 14, 16 on the lower portion and on the upper portion may be double connecting plates 178.

In a further alternative embodiment the "T" shaped quick connector assembly 28 may have supplemental mating brackets 48 or supplemental quick connector assemblies secured in a normal direction to the exterior of the "T" shaped quick connector assembly 28, in any combination, as required for a particular application.

In the embodiment as shown in FIGS. 18 and 19 mechanical fasteners will pass through the left connecting plate 16, the other structural support 188, the right connecting plate 14, and the walls 186 of the supplemental quick connector assembly 28 having the right and left connecting plates 14, 16.

In some embodiments, the bottom of a vertical structural support 54 and/or central support 184 may be engaged to a base 194 through any desired quick release mechanism or fastener including the use of screws, bolts, or by insertion within a cavity. Any reference herein to mechanical fasteners may include the use of bolts and nuts, screws, shafts, bars and/or pins as may be appropriate for a particular application. Alternatively, a quick connector assembly 28 and a quick release assembly 38 may be used, as attached to, or integral with, the base 194. Further, the bottom of a vertical structural support 54 or central support 184 may be integral and permanently attached to the base 194.

In some alternative embodiments, a corner may be established through the use of a vertical structural support 54 and/or central support 184 connected to a base 194. At the top of the structural support 54 and/or central support 184 an upper pair 157 of right and left connecting plates 14, 16 may extend in a first direction. Below the upper pair 157 of the right and left connecting plates 14, 16 may be a lower pair 159 of right and left connecting plates 14, 16 which are disposed at a right angle of 90 degrees relative to the upper pair 157 of right and left connecting plates 14, 16.

Another structural support 54 and/or central support 184 may be located a desired distance from the corner support. The adjacent structural support 54 and/or central support 184 may include another upper pair 157 and another lower pair 159 of right and left connecting plates 14, 16 which are horizontally aligned with the upper pair 157 and lower pair 159 of right and left connecting plates 14, 16 on the corner structural support 54.

In this embodiment, a horizontal structural support 150 will be releasably secured to the lower pair 159 of right and left connecting plates 14, 16 on the corner support and the lower pair 159 of right and left connecting plates 14, 16 on the adjacent support. In this embodiment, the height dimension of the horizontal structural support 150 will be reduced as compared to a horizontal structural support 150 between aligned and adjacent vertical structural supports 54.

In an alternative embodiment, a vertical support having and upper pair 157 of right and left connecting plates 14, 16, or double connecting plates 178 may be positioned next to the adjacent support. A horizontal structural support 150 may then be releasably attached to the upper pair 157 of right and left connecting plates 14, 16 on the adjacent vertical support, and the opposite end of horizontal structural support 150 may be releasably engaged to the upper pair 157 of right and left connecting plates 14, 16 on the next vertical support.

In some embodiments, any desired number or corner vertical supports may be used to create any desired shape or form of walking or passage including being serpentine in shape, such as may be found in an airline passenger terminal or at a checkpoint.

It should be noted that the structural supports 54, brace structural supports 156, horizontal structural supports 150, and/or central supports 184 whether disposed in a vertical or horizontal direction, may have any desired length or height dimension to achieve the needs of a particular application. It should also be noted that the structural supports 54, brace structural supports 156, horizontal structural supports 150 and/or central supports 184 may be quickly and easily disassembled for storage following use.

In at least one embodiment a single line of vertical structural supports 54, and central supports 184 having a base 194 and a horizontal structural support 150 extending therebetween, may be assembled to form a barrier. In this embodiment and awning 78 having any desired markings, corporate logo or other imprinted information may be suspended from the aligned horizontal structural support(s) 150.

In at least one embodiment, a double connecting plate 178 is not required to be used and may be replaced through the use of a stacked upper pair 157 of right and left connecting plates 14, 16 in a first direction, and a lower pair 159 of right and left connecting plates 14, 16 disposed in the same direction or in an opposite direction on a structural support 54. The upper pair 157 and lower pair 159 may be positioned directly or immediately below each other. Alternatively, the upper pair 157 and lower pair 159 may be spatially separated from each other by any desired dimension.

In some embodiments a horizontal structural support 150 may be releasably attached to a right and left connecting plate 14, 16 as described herein by movement downwardly into the alignment guides 58 and load axis apertures 72. In alternative embodiments, a horizontal structural support 150 may be releasably secured to a right and left connecting plate 14, 16 by movement vertically in an upward direction from below. In this embodiment the direction of the alignment guides 58 has been reversed approximately 180°. Releasable attachment of a horizontal structural support 150 to a right and left connecting plate 14, 16, in an upward direction from below, may be used in any particular custom application.

Figure 3:
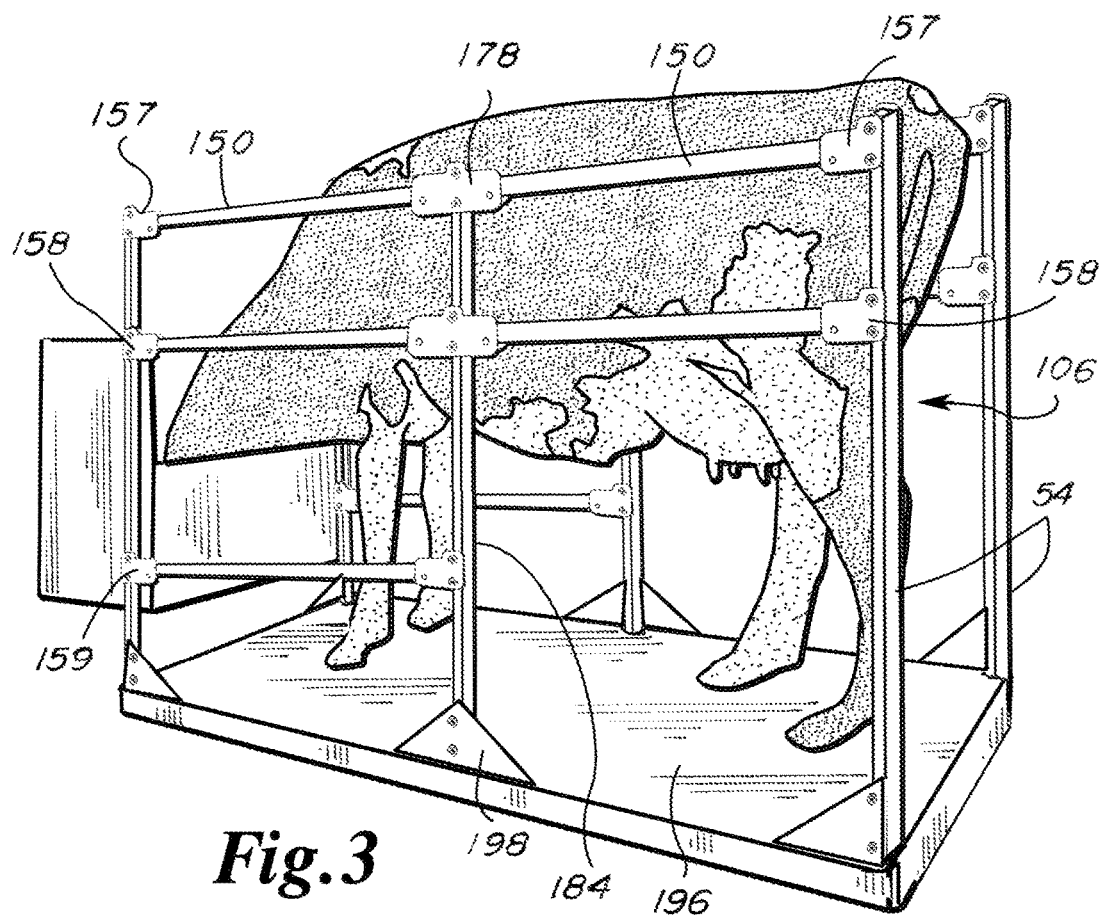
FIG. 3 is an environmental view of one alternative embodiment of the releasable connection frame assembly.

Referring to FIG. 3, in at least one embodiment, a vertically disposed structural support 54 and/or central support 184 may be secured to a platform 196 having gusset plates or braces 198. In at least one embodiment as seen in FIG. 3, each structural support 54 and/or central support 184 may include an upper right and left connecting plate 14, 16, a lower right and left connecting plate 14, 16 or a set of double connecting plates 178 in any combination. In addition, any desired and horizontally aligned lower pair 159 of right and left connecting plates 14, 16 may be positioned at any vertical distance above the platform 196 and below the upper pair 157 of connecting plates. Further, in some embodiments, a third set of aligned right and left connecting plates 14, 16 may be disposed above the platform 196 and below the upper pair 157 of connecting plates as desired.

In at least one embodiment, a structural support 54 may have opposite ends. A cam assembly 29, quick connector assembly 28 or a quick release assembly 38 may be proximate to an upper end thereof. At an opposite end the structural support 54 may have a right and left connecting plate 14, 16 attached for positioning in any desired direction. In this embodiment the alignment guides 58 will be disposed for receipt of a horizontal structural support 150 or brace structural support 156 for releasable coupling from above or from below dependent on the requirements of a particular application.

Alternatively, the right and left connecting plate 14, 16 may be attached to the structural support 54 for positioning in any desired direction relative thereto, at any desired location between the opposite ends of the structural support 54.

Alternatively, an upper pair 157 of the right and left connecting plates 14, 16 may be attached to a structural support 54 for positioning in any desired direction and may be aligned with, or normal with respect to, a lower pair 159 of connecting plates. The upper pair 157 of connecting plates will be attached to the structural support 54 proximate to one end, and the lower pair 159 of connecting plates at an opposite end of the structural support 54, any desired location. The direction of the alignment guides 58 for the upper pair 157 of connecting plates may be disposed for receipt of a horizontal structural support 150 or brace structural support 156 for releasable coupling from a direction from above, or from below at the discretion of an individual.

In at least one embodiment, a structural support 54 may have opposite ends. A cam assembly 29, quick connector assembly 28 or a quick release assembly 38 may be proximate to an upper end thereof. The opposite end the structural support 54 may have a pair of double connecting plates 178 attached for positioning in any desired direction. In this embodiment, the alignment guides 58 may be disposed for receipt of a horizontal structural support 150 or brace structural support 156 for releasable coupling from above or from below to meet the requirements of a particular application. Alternatively, the double connecting plates 178 may be attached to the structural support 54 for positioning in any desired direction relative to the structural support 54 at any location between the opposite ends.

Alternatively, an upper pair 157 of connecting plates or double connecting plates 178 may be attached to the structural support 54 for positioning in any desired direction, and may be aligned with or normal with respect to a lower pair 159 of connecting plates or double connecting plates 178. The upper pair 157 of connecting plates or double connecting plates 178 will be attached to the structural support 54 between the opposite ends, and the lower pair 159 of connecting plates or double connecting plates 178 may be attached to the structural support 54 at any desired location. The direction of the alignment guides 58 within the upper pair of connecting plates or double connecting plates 178 may be disposed for receipt of a horizontal structural support 150, or a brace structural support 156, for releasable coupling from a direction from above or from below at the discretion of an individual.

Further, an upper pair 157 of connecting plates may be attached to a structural support 54 for positioning in any desired direction, and may be aligned with or normal with respect to a single pair or multiple pair of double connecting plates 178. The upper pair 157 of connecting plates will be attached to the structural support 54 at any location between the opposite ends of the structural support 54. The direction of the alignment guides 58 within the upper pair 157 of connecting plates may be disposed for receipt of a horizontal structural support 150 or brace structural support 156 for releasable coupling from a direction from above or from below at the discretion of an individual.

In at least one embodiment, a structural support 54 may have opposite ends. A cam assembly 29, quick connector assembly 28 or a quick release assembly 38 may be proximate to an upper end thereof. The opposite end of the structural support 54 may have a lower pair 159 of connecting plates attached for positioning in any direction. In some embodiments the alignment guides 58 will be disposed for receipt of a horizontal structural support 150 or brace structural support 156 for releasable coupling from above or from below. Alternatively, the lower pair 159 of connecting plates may be attached to the structural support 54 for positioning in any desired direction relative to the structural support 54, at any desired location between the an upper end and the opposite end of structural support 54.

In addition, a upper pair 157 of connecting plates or double connecting plates 178 may be attached to the structural support 54 for positioning in any desired direction and may be aligned with, or normal with respect to, the lower pair 159 of connecting plates. The upper pair 157 of connecting plates or double connecting plates 178 will be attached to the structural support 54 proximate to an upper end and the lower pair 159 of connecting plates will be positioned at any desired location on the structural support 54. The direction of the alignment guides 58 within the upper pair 157 of connecting plates or double connecting plates 178 may be disposed for receipt of a horizontal structural support 150 or brace structural support 156 for releasable coupling from a direction from above or from below at the discretion of an individual.

In at least one embodiment, a structural support 54 may have opposite ends. A cam assembly 29, quick connector assembly 28 or a quick release assembly may be proximate to an upper end thereof. At the opposite end, the structural support 54 may have a pair of load retention pins 24 and release pins 26 extending outwardly from opposite sides of the structural support 54. In this embodiment, the load retention pins 24 and release pins 26 may be disposed in a first direction or in a second direction which is 90 degrees or normal relative to the first direction.

Alternatively, the load retention pins 24 and release pins 26 as earlier described may be engaged to and extend outwardly from the opposite sides of the structural support 54 at any desired location and in any desired direction between the upper end and the opposite end of the structural support 54.

In at least one embodiment, a horizontal structural support 150 as earlier described at a first end may have a pair of fasteners 22 and load retention pins 24 extending outwardly from opposite sides of the horizontal structural support 150.

At the second end another pair of fasteners 22 and load retention pins 24 may extend outwardly from the same side or from opposite sides of the horizontal structural support 150. In one embodiment the fasteners 22 and load retention pins 24 at the first end and the second end will be aligned in the same direction. In an alternative embodiment, the fasteners 22 and the load retention pins 24 at the first end and the second end will be 90 degrees offset, or positioned normally relative to each other. In another alternative embodiment, the fasteners 22 and load retention pins 24 on the horizontal structural support 150 are not required to be disposed proximate to a first end or a second end and may be positioned at any desired location along the length of the horizontal structural support 150.

A right and left connecting plate 14, 16 or pair of double connecting plates 178 may in an alternative embodiment include both an upwardly and downwardly directed alignment guide 58 having a load axis aperture 72 positioned centrally therebetween. This embodiment permits the simultaneous receipt of a horizontal structural support 150 having load retention pins 24 and release pins 26 from a direction from above or from below the connecting plates or pair of double connecting plates 178.

In at least one embodiment, the method for assembly of a support frame for an awning 78 initiates with the attachment of a plurality of upper mating brackets 48 to a vertical surface. A bracket with a "C" channel 164 may be engaged to a vertical surface either before or after the attachment of the upper mating brackets 48. The bracket with the "C" channel 164 is preferably attached to a vertical wall surface above the upper mating bracket 48.

A structural support 54 having a cam assembly 29 may then be releasably engaged to each upper mating bracket 48 extending outwardly therefrom. Each structural support 54 will include at a distal end 18 a right and left connecting plate 14, 16 extending outwardly therefrom in the same direction in addition, an intermediate pair 158 of right and left connecting plates 14, 16 are attached to the structural support 54 between the cam assembly 29 and the distal end 18. The intermediate pair 158 of right and left connecting plates 14, 16 as connected to the structural support 54 preferably extend downwardly and outwardly therefrom at an angle of 90 degrees relative to the right and left connecting plates 14, 16 proximate to the distal end 18.

A plurality of lower mating brackets 48 are attached to a vertical wall surface below the plurality of upper mating brackets 48. The upper mating brackets 48 are horizontally aligned at a desired height and the lower mating brackets 48 are horizontally aligned at a desired reduced height as compared to the upper mating brackets 48.

A brace structural support 156 having a cam assembly 29 is then releasably engaged to the lower mating brackets 48 as earlier described. The opposite or distal end 18 of the brace structural support 156 preferably includes a quick release assembly 38 having a compression spring 60 having opposite pairs of load retention pins 24 and release pins 26. The load retention pins 24 are movably located in the load axis apertures 72 of the intermediate pair 158 of a right and left connecting plate 14, 16. (FIGS. 1-2)

Attachment of the load retention pins 24 of the brace structural support 156 to the load axis apertures 72 of the intermediate pair 158 of right and left connecting plates 14, 16 may occur by elevating the structural support 54 as pivoting about the cam shaft 46. The brace structural support 156 may then be elevated vertically to align the quick release 38 to the intermediate 158 right and left connecting plates 14, 16. In this position, the compression spring 60 having the load retention pins 24 and release pins 26 is adjacent to the lower surface of the structural support 54. While securely holding the brace structural support 156, the structural support 54 is permitted to pivot downwardly about the cam shaft 46, where the upper surface of the brace structural support 156 slides downwardly along the lower side of the structural support 54 towards the intermediate pair 158 of the right and left connecting plates 14, 16. The load retention pins 24 slidably enters the alignment guides 58 of the intermediate pair 158 of the right and left connecting plates 14, 16 descending to a position aligned with the load axis apertures 72.

The compression spring 60 then moves the load retention pins 24 outwardly into the load axis apertures 72 releasably coupling the brace structural support 156 to the structural support 54 at the intermediate pair 158 of right and left connecting plates 14, 16. The coupling of a brace structural support 156 to a structural support 54 will be repeated for each vertically aligned upper mating bracket 48 and lower mating bracket 48.

The horizontal structural supports 150 having the quick release assembly 38 at each of the opposite ends may then be releasably coupled in a parallel/horizontal position relative to a vertical surface between adjacent right and left connecting plates 14, 16 of the structural supports 54.

Initially one end of a horizontal structural support 150 will be disposed above the alignment guide 58 of a right and left connecting plate 14, 16 of an distal end 18 of a structural support 54. The end of the horizontal structural support 150 will then be forced downwardly for positioning the load retention pins 24 within the alignment guides 58 of the right and left connecting plates 14, 16. The opposite end of the horizontal structural support 150 may then be pivotally rotated downwardly about the load pin axis 68 to position the load retention pins 24, of the opposite end of the horizontal structural support 150, adjacent to the right and left connecting plates 14, 16 of the adjacent structural support 54. The opposite end of the horizontal structural support 150 may then be manipulated downwardly inserting the load retention pins 24 into the alignment guides 58 of the adjacent right and left connecting plates 14, 16 as secured to the adjacent structural support 54. The load retention pins 24 on the opposite end of the horizontal structural support 150 will then move downwardly for positioning of the load retention pins 24 within the load axis apertures 72 of the right and left connecting plates 14, 16 of the adjacent structural support 54. Two adjacent structural supports 54 and two brace structural supports 156 will then be releasably coupled together through the use of the horizontal structural support 150.

An awning 78 may then be placed over the upper surface of the structural supports 54 and horizontal structural supports 150 where a "C" tube of an awning 78 will be slidably positioned within the bracket with "C" channel 164. The awning 78 may include a zipper proximate to the bracket with "C" channel 164 to facilitate removal and/or storage.

In order to remove an awning 78 from a quick release support structure the actions as identified above may be performed in a reverse order.

It should be noted that the horizontal structural support 150 may be coupled to the structural supports 54 either prior to or after the coupling of the brace structural supports 156 to the structural supports 54. It should also be noted that the structural supports 54, brace structural supports 156, and horizontal structural supports 150 may be uncoupled from each other and transported or stored at any desired location.

In some embodiments to uncouple the components of the structural supports 54, brace structural supports 156 and horizontal structural supports 150 an individual may depress the aligned release pins 26 located on opposite sides of a brace structural support 156, or a horizontal structural support 150. The depression of the release pins 26 inwardly is restricted by the exterior stop edges 174. The depression of the release pins 26 exert compression force on the prongs 170 of the compression spring 60. The depression of the release pins 26 inwardly retracts the load retention pins 24 from the load axis apertures 72 permitting the vertical separation or lifting of a respective end of a brace structural support 156 or horizontal structural support 150, moving the load retention pins 24 outwardly from an alignment guide 58. A horizontal structural support 150 may then be uncoupled from adjacent structural supports 54 and the respective brace structural supports 156 may be uncoupled from an intermediate pair 158 of a right and left connecting plates 14, 16.

In some embodiments, each structural support 54, brace structural support 156, horizontal structural support 150 and/or central support 184 may be formed of any desired material including metal, composite materials, fiber, plastic and combinations thereof. In addition each structural support 54, brace structural support 156, horizontal structural support 150 and/or central support 184 may have any length and size dimension which is optimal for a specific application.

In some embodiments, each compression spring 60 having load retention pins 24 and release pins 26 may vary in tension/compression, diameter and height dimensions for the load retention pins 24 and release pins 26 as needed for a particular application. In some embodiments is contemplated that a structural support 54, brace structural support 156, horizontal structural support 150 and/or central support 184 may or may not include a telescoping connection feature.

In a preferred embodiment it is contemplated that a plurality of structural supports 54, brace structural supports 156, horizontal structural supports 150 and central supports 184 may be releasably coupled to each other to form a frame structure for an awning 78 without the use of tools, including ladders.

In a first embodiment, a releasable connection frame assembly includes a structural support having a first end, a second end, a central section, and opposite sides, a cam assembly secured to the first end, a right and left connecting plate connected to the opposite sides of the structural support proximate to the second end, the right connecting plate having a first alignment guide having angular descending guide edges and a first load axis aperture, the left connecting plate having a second alignment guide having second descending guide edges and a second load axis aperture, wherein the right and left connecting plates are reverse images relative to each other, and further wherein the right and left connecting plates extend outwardly from the structural support in an identical direction, the right and left connecting plates being parallel to each other, and the first alignment guide and the second alignment guide being disposed toward an interior between the right and left connecting plates.

In a second alternative embodiment according to the first embodiment, the first load axis aperture is proximate to a bottom of the first alignment guide and the second load axis aperture is proximate to a second bottom of the second alignment guide.

In a third alternative embodiment according to the second embodiment, the first load axis aperture and the second load axis aperture are aligned relative to each other.

In a fourth alternative embodiment according to the first embodiment, the central section includes a third connecting plate and a fourth connecting plate, the third and fourth connecting plates extending outwardly from the central section in a direction which is perpendicular relative to the right and left connecting plates.

In a fifth alternative embodiment according to the fourth embodiment, the third connecting plate has a third alignment guide, third angular descending guide edges, and a third load axis aperture, the fourth connecting plate has a fourth alignment guide, fourth angular descending guide edges, and a fourth load axis aperture and wherein the third and fourth connecting plates are reverse images relative to each other.

In a sixth alternative embodiment according to the fifth embodiment, the third and fourth connecting plates extend outwardly from the central section in an identical direction, the third and fourth connecting plates being parallel to each other, and the third alignment guide and the fourth alignment guide being disposed toward an interior between the third and fourth connecting plates.

In a seventh alternative embodiment a releasable connection frame assembly includes a structural support having a first end, a second end, opposite sides, an interior, a first load pin aperture proximate to the second end on one of the opposite sides, a first release pin aperture proximate to the second end on one of the opposite sides, the first release pin aperture being located between the first load pin aperture and the first end, a second load pin aperture proximate to the second end on the other of the opposite sides, and a second release pin aperture proximate to the second end on the other of the opposite sides, the second release pin aperture being located between the second load pin aperture and the first end, a cam assembly secured to the first end, and a quick release assembly engaged to the interior of the second end, the quick release assembly having a spring, the spring having a first prong and a second prong, the first prong having a first load pin disposed in the first load pin aperture, the first prong having a first release pin disposed in the first release pin aperture, the second prong having a second load pin disposed in the second load pin aperture, the second prong having a second release pin disposed in the second release pin aperture, wherein the spring has a first expanded configuration where the first prong is proximate to the interior of one of the opposite sides and the first load pin extends through the first load pin aperture and the first release pin extends through the first release pin aperture and further wherein the second prong is proximate to the interior of the other of the opposite sides and the second load pin extends through the second load pin aperture, and the second release pin extends through the second release pin aperture, the spring having a second retracted configuration where the first release pin and the second release pin have been moved towards each other compressing the spring and the first load pin has been retracted towards the interior one of the opposite sides within the first load pin aperture and the second load pin has been retracted towards the interior of the other of the opposite sides within the second load pin aperture.

In an eighth alternative embodiment according to the seventh embodiment, the second end has an end cap, the end cap having a stop extending into the interior, the stop having two exterior stop edges.

In a ninth alternative embodiment according to the eighth embodiment, in said second retracted configuration the first prong is in contact with one of the two exterior stop edges and the second prong is in contact with the other of the two exterior stop edges limiting compression of the spring and limiting retraction of the first load pin within the first load pin aperture, limiting retraction of the first release pin within the first release pin aperture, limiting retraction of the second load pin within the second load pin aperture, and limiting retraction of the second release pin within the second release pin aperture.

In a tenth alternative embodiment a releasable connection frame assembly includes a structural support having a first end and a second end, opposite sides, an interior, a first load pin aperture proximate to the first end on one of the opposite sides, a first release pin aperture proximate to the first end on one of the opposite sides, the first release pin aperture being located between the first load pin aperture and the second end, a second load pin aperture proximate to the first end on the other of the opposite sides, a second release pin aperture proximate to the first end on the other of the opposite sides, the second release pin aperture being located between the second load pin aperture and the second end, a third load pin aperture proximate to the second end on one of the opposite sides, a third release pin aperture proximate to the second end on one of the opposite sides, the third release pin aperture being located between the third load pin aperture and the first end, a fourth load pin aperture proximate to the second end on the other of the opposite sides, a fourth release pin aperture proximate to the second end on the other of the opposite sides, the fourth release pin aperture being located between the fourth load pin aperture and the first end, a first quick release assembly engaged to the interior of the first end, the first quick release assembly having a first spring, the first spring having a first prong and a second prong, the first prong having the first load pin disposed in the first load pin aperture, the first prong having the first release pin disposed in the first release pin aperture, the second prong having the second load pin disposed in the second load pin aperture, the second prong having the second release pin disposed in the second release pin aperture, a second quick release assembly engaged to the interior of the second end, the second quick release having a second spring, the second spring having a third prong and a fourth prong, the third prong having the third load pin disposed in the third load pin aperture, the third prong having the third release pin disposed in the third release pin aperture, the fourth prong having the fourth load pin disposed in the fourth load pin aperture, the fourth prong having the fourth release pin disposed in the fourth release pin aperture, wherein the first spring has an engaged position and a retracted position and the second spring has an engaged position and a retracted position, and a first end cap positioned in the first end, the first end cap having a first stop extending into the interior, the first stop being positioned between the first prong and the second prong, a second end cap positioned in the second end, the second end cap having a second stop extending into the interior, the second stop being positioned between the third prong and the fourth prong.

In an eleventh alternative embodiment according to the tenth embodiment, the first stop has two first exterior stop edges and the second stop has two second exterior stop edges.

In a twelfth alternative embodiment according to the eleventh embodiment, in the retracted position the first prong is in contact with one of the two first exterior stop edges and the second prong is in contact with the other of the two first exterior stop edges.

In a thirteenth alternative embodiment according to the eleventh embodiment in the retracted position the third prong is in contact with one of the two second exterior stop edges and the fourth prong is in contact with the other of the two second exterior stop edges.

In a fourteenth alternative embodiment according to the twelfth embodiment, the two first exterior stop edges limit retraction of the first load pin within the first load pin aperture and the second load pin within the second load pin aperture.

In a fifteenth alternative embodiment according to the thirteenth embodiment, the two second exterior stop edges limit retraction of the third load pin within the third load pin aperture and the fourth load pin within the fourth load pin aperture.

In a sixteenth alternative embodiment a releasable connection frame assembly includes a first structural support having a first end and first opposite sides, a right and left connecting plate connected to the first opposite sides proximate to the first end, the right connecting plate having a first alignment guide having first angular descending guide edges and a first load axis aperture, the left connecting plate having a second alignment guide having second descending guide edges and a second load axis aperture, wherein the right and left connecting plates are reverse images relative to each other, and further wherein the right and left connecting plates extend outwardly from the first end in an identical direction, the right and left connecting plates being parallel to each other, and the first alignment guide and the second alignment guide being disposed toward an interior between the right and left connecting plates, a second structural support having a second end, an interior, and second opposite sides, a first load pin aperture proximate to the second end on one of the second opposite sides, a first release pin aperture proximate to the first load pin aperture on one of the second opposite sides and distal relative to the second end, a second load pin aperture proximate to the second end on the other of the opposite sides, and a second release pin aperture proximate to the second load pin aperture on the other of the second opposite sides and distal relative to the second end, and a quick release assembly engaged to the interior of the second end, the quick release assembly having a spring, the spring having a first prong and a second prong, the first prong having a first load pin disposed in the first load pin aperture and a first release pin disposed in the first release pin aperture, the second prong having a second load pin disposed in the second load pin aperture and a second release pin disposed in the second release pin aperture, wherein the spring has a first expanded configuration where the first prong is proximate to the interior of one of the second opposite sides and the first load pin extends through the first load pin aperture and the first release pin extends through the first release pin aperture, and further wherein the second prong is proximate to the interior of the other of the second opposite sides and the second load pin extends through the second load pin aperture, and the second release pin extends through the second release pin aperture, the spring having a retracted configuration where the first release pin and the second release pin have been moved towards each other compressing the spring, and the first load pin has been retracted towards the interior within the first load pin aperture and the second load pin has been retracted towards the interior within the second load pin aperture, wherein the first load pin engages at least one of the first alignment guide, the first angular descending guide edges, and the first load axis aperture, and the second load pin engages at least one of the second alignment guide, the second descending guide edges and the second load axis aperture during transition into a releasably connected configuration of the first structural support to the second structural support and wherein in the releasably connected configuration the first load pin is disposed in the first load axis aperture and the second load pin is disposed in the second load axis aperture.

In a seventeenth alternative embodiment according to the sixteenth embodiment, at least one of the first structural support and the second structural support have a cam end and a cam assembly secured to the cam end.

In an eighteenth alternative embodiment according to the seventeenth embodiment, the first load axis aperture is proximate to a bottom of the first alignment guide and the second load axis aperture is proximate to a second bottom of the second alignment guide.

In a nineteenth alternative embodiment according to the eighteenth embodiment, the first load axis aperture and the second load axis aperture are aligned relative to each other.

In a twentieth alternative embodiment according to the nineteenth embodiment, at least one of the first structural support and the second structural support have a central section having a third and fourth connecting plate, the third and fourth connecting plates extending outwardly from the central section in a direction which is perpendicular relative to the right and left connecting plates.

In a twenty-first alternative embodiment according to the twentieth embodiment, the third connecting plate has a third alignment guide, third angular descending guide edges, and a third load axis aperture, and the fourth connecting plate has a fourth alignment guide, fourth angular descending guide edges, and a fourth load axis aperture, wherein the third and fourth connecting plates are reverse images relative to each other.

In a twenty-second alternative embodiment according to the twenty-first embodiment, the third and fourth connecting plates extend outwardly from the central section in an identical direction, the third and fourth connecting plates being parallel to each other, and the third alignment guide and the fourth alignment guide being disposed toward an interior between the third and fourth connecting plates.

In a twenty-third alternative embodiment according to the seventeenth embodiment, the first structural support has an inside, at least one of the first structural support and the second structural support has a quick release end and quick release end opposite sides, a third load pin aperture proximate to the quick release end on one of the quick release end opposite sides, a third release pin aperture proximate to the third load pin aperture on one of the quick release end opposite sides and distal relative to the quick release end, a fourth load pin aperture proximate to the quick release end on the other of the quick release end opposite sides, a fourth release pin aperture proximate to the fourth load pin aperture on the other of the quick release end opposite sides and distal relative to the quick release end, a second quick release assembly engaged to the inside of the quick release end, the second quick release assembly having a second spring, the second spring having a third prong and a fourth prong, the third prong having a third load pin disposed in the third load pin aperture and a third release pin disposed in the third release pin aperture, the fourth prong having a fourth load pin disposed in the fourth load pin aperture and a fourth release pin disposed in the fourth release pin aperture, wherein the second spring has a second expanded configuration where the third prong is proximate to the inside of one of the quick release end opposite sides and the third load pin extends through the third load pin aperture and the third release pin extends through the third release pin aperture and further wherein the fourth prong is proximate to the inside of the other of the quick release end opposite sides and the fourth load pin extends through the fourth load pin aperture, and the fourth release pin extends through the fourth release pin aperture, the second spring having a second retracted configuration where the third release pin and the fourth release pin have been moved towards each other compressing the second spring and the third load pin has been retracted towards the inside within the third load pin aperture and the fourth load pin has been retracted towards the inside within the second load pin aperture.

In a twenty-fourth alternative embodiment according to the twenty-third embodiment, the quick release end has a quick release end cap, the quick release end cap having a quick release stop extending into the inside, the quick release stop having two exterior quick release stop edges.

In a twenty-fifth alternative embodiment according to the twenty-fourth embodiment, in the second retracted configuration the third prong is in contact with one of the two exterior quick release stop edges and the fourth prong is in contact with the other of the two exterior quick release stop edges limiting compression of the second spring and limiting retraction of the third load pin within the third load pin aperture and limiting retraction of the third release pin within the third release pin aperture, limiting retraction of the fourth load pin within the fourth load pin aperture and limiting retraction of the fourth release pin within the fourth release pin aperture.

In a twenty-sixth alternative embodiment according to the twenty-fifth embodiment, one of the two exterior quick release stop edges limit retraction of the third load pin within the third load pin aperture and the fourth load pin within the fourth load pin aperture.

In a twenty-seventh alternative embodiment a releasable connection frame assembly includes a first structural support having a first end and first opposite sides, a right and left connecting plate connected to the first opposite sides proximate to the first end, the right connecting plate having a first alignment guide having first angular descending guide edges and a first load axis aperture, the left connecting plate having a second alignment guide having second descending guide edges and a second load axis aperture, wherein the right and left connecting plates are reverse images relative to each other, and further wherein the right and left connecting plates extend outwardly from the first end in an identical direction, the right and left connecting plates being parallel to each other, and the first alignment guide and the second alignment guide being disposed toward an interior between the right and left connecting plates, a second structural support having a second end, an interior, and second opposite sides, a first load pin aperture proximate to the second end on one of the second opposite sides, a first release pin aperture proximate to the first load pin aperture on one of the second opposite sides and distal relative to the second end, a second load pin aperture proximate to the second end on the other of the opposite sides, and a second release pin aperture proximate to the second load pin aperture on the other of the second opposite sides and distal relative to the second end, and a quick release assembly engaged to the interior of the second end, the quick release assembly having a spring, the spring having a first prong and a second prong, the first prong having a first load pin disposed in the first load pin aperture and a first release pin disposed in the first release pin aperture, the second prong having a second load pin disposed in the second load pin aperture and a second release pin disposed in the second release pin aperture, wherein the spring has a first expanded configuration where the first prong is proximate to the interior of one of the second opposite sides and the first load pin extends through the first load pin aperture and the first release pin extends through the first release pin aperture, and further wherein the second prong is proximate to the interior of the other of the second opposite sides and the second load pin extends through the second load pin aperture, and the second release pin extends through the second release pin aperture, the spring having a retracted configuration where the first release pin and the second release pin have been moved towards each other compressing the spring, and the first load pin has been retracted towards the interior within the first load pin aperture and the second load pin has been retracted towards the interior within the second load pin aperture, wherein the first load pin engages at least one of the first alignment guide, the first angular descending guide edges, and the first load axis aperture, and the second load pin engages at least one of the second alignment guide, the second descending guide edges and the second load axis aperture during transition into a releasably connected configuration of the first structural support to the second structural support and wherein in the releasably connected configuration the first load pin is disposed in the first load axis aperture and the second load pin is disposed in the second load axis aperture.

In a twenty-eighth alternative embodiment according to the twenty-seventh embodiment, at least one of the first structural support and the second structural support have a cam end and a cam assembly secured to the cam end.

In a twenty-ninth alternative embodiment according to the twenty-eighth embodiment, the first load axis aperture is proximate to a bottom of the first alignment guide and the second load axis aperture is proximate to a second bottom of the second alignment guide.

In a thirtieth alternative embodiment according to the twenty-ninth embodiment, the first load axis aperture and the second load axis aperture are aligned relative to each other.

In a thirty-first alternative embodiment according to the thirtieth embodiment, at least one of the first structural support and the second structural support have a central section having a third and fourth connecting plate, the third and fourth connecting plates extending outwardly from the central section in a direction which is perpendicular relative to the right and left connecting plates.

In a thirty-second alternative embodiment according to the thirty-first embodiment, the third connecting plate has a third alignment guide, third angular descending guide edges, and a third load axis aperture, and the fourth connecting plate has a fourth alignment guide, fourth angular descending guide edges, and a fourth load axis aperture, wherein the third connecting plate and the fourth connecting plate are reverse images relative to each other.

In a thirty-third alternative embodiment according to the thirty-second embodiment, the third and fourth connecting plates extend outwardly from the central section in an identical direction, the third and fourth connecting plates being parallel to each other, and the third alignment guide and the fourth alignment guide being disposed toward an interior between the third and fourth connecting plates.

In a thirty-fourth alternative embodiment according to the twenty-seventh embodiment, the first structural support has an inside, at least one of the first structural support and the second structural support have a quick release end and quick release end opposite sides, a third load pin aperture proximate to the quick release end on one of said quick release end opposite sides, a third release pin aperture proximate to the third load pin aperture on one of the quick release end opposite sides and distal relative to the quick release end, a fourth load pin aperture proximate to the quick release end on the other of the quick release end opposite sides, a fourth release pin aperture proximate to the fourth load pin aperture on the other of the quick release end opposite sides and distal relative to the quick release end.

In a thirty-fifth alternative embodiment according to the thirty-fourth embodiment, a second quick release assembly is engaged to the inside of the quick release end, the second quick release assembly having a second spring, the second spring having a third prong and a fourth prong, the third prong having a third load pin disposed in the third load pin aperture and a third release pin disposed in the third release pin aperture, the fourth prong having a fourth load pin disposed in the fourth load pin aperture and a fourth release pin disposed in the fourth release pin aperture.

In a thirty-sixth alternative embodiment according to the thirty-fifth embodiment, the second spring has a second expanded configuration where the third prong is proximate to the inside of one of the quick release end opposite sides and the third load pin extends through the third load pin aperture and the third release pin extends through the third release pin aperture.

In a thirty-seventh alternative embodiment according to the thirty-sixth embodiment, the fourth prong is proximate to the inside of the other of the quick release end opposite sides and the fourth load pin extends through the fourth load pin aperture, and the fourth release pin extends through the fourth release pin aperture, the second spring has a second retracted configuration where the third release pin and the fourth release pin have been moved towards each other compressing the second spring and the third load pin has been retracted towards the inside within the third load pin aperture and the fourth load pin has been retracted towards the inside within the fourth load pin aperture.

In a thirty-eighth alternative embodiment according to the thirty-seventh embodiment, the quick release end has a quick release end cap, the quick release end cap has a quick release stop extending into the inside, the quick release stop has two exterior quick release stop edges.

In a thirty-ninth alternative embodiment according to the thirty-eighth embodiment, in the second retracted configuration the third prong is in contact with one of the two exterior quick release stop edges and the fourth prong is in contact with the other of the two exterior quick release stop edges limiting compression of the second spring and limiting retraction of the third load pin within the third load pin aperture and limiting retraction of the third release pin within the third release pin aperture, limiting retraction of the fourth load pin within the fourth load pin aperture and limiting retraction of the fourth release pin within the fourth release pin aperture.

In a fortieth alternative embodiment according to the thirty-ninth embodiment, one of the two exterior quick release stop edges limit retraction of the third load pin within the third load pin aperture and the fourth load pin within the fourth load pin aperture.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

I claim:

1. A releasable connection frame assembly comprising:
a first structural support having a first end and first opposite sides;
a right connecting plate and a left connecting plate connected to said first opposite sides proximate to said first end, said right connecting plate having a first alignment guide having first angular descending guide edges and a first load axis aperture, said left connecting plate having a second alignment guide having second descending guide edges and a second load axis aperture, wherein said right connecting plate and said left connecting plate are reverse images relative to each other, and further wherein said right connecting plate and said left connecting plate extend outwardly from said first end in an identical direction, said right connecting plate and said left connecting plate being parallel to each other, and said first alignment guide and said second alignment guide being disposed toward an interior between said right connecting plate and said left connecting plate;
a second structural support having a second end, an interior, and second opposite sides, a first load pin aperture proximate to said second end on one of said second opposite sides, a first release pin aperture proximate to said first load pin aperture on one of said second opposite sides and distal relative to said second end, a second load pin aperture proximate to said second end on the other of said opposite sides, and a second release pin aperture proximate to said second load pin aperture on the other of said second opposite sides and distal relative to said second end; and
a quick release assembly engaged to said interior of said second end, said quick release assembly having a spring, said spring having a first prong and a second prong, said first prong having a first load pin disposed in said first load pin aperture and a first release pin disposed in said first release pin aperture, said second prong having a second load pin disposed in said second load pin aperture and a second release pin disposed in said second release pin aperture, wherein said spring has a first expanded configuration where said first prong is proximate to said interior of one of said second opposite sides and said first load pin extends through said first load pin aperture and said first release pin extends through said first release pin aperture, and further wherein said second prong is proximate to said interior of the other of said second opposite sides and said second load pin extends through said second load pin aperture, and said second release pin extends through said second release pin aperture, said spring having a retracted configuration where said first release pin and said second release pin have been moved towards each other compressing said spring, and said first load pin has been retracted towards said interior within said first load pin aperture and said second load pin has been retracted towards said interior within said second load pin aperture;
wherein said first load pin engages at least one of said first alignment guide, said first angular descending guide edges, and said first load axis aperture, and said second load pin engages at least one of said second alignment guide, said second descending guide edges and said second load axis aperture during transition into a releasably connected configuration of said first structural support to said second structural support and wherein in said releasably connected configuration said first load pin is disposed in said first load axis aperture and said second load pin is disposed in said second load axis aperture.

2. The releasable connection frame assembly according to claim 1, at least one of said first structural support and said second structural support having a cam end and a cam assembly secured to said cam end.

3. The releasable connection frame assembly according to claim 1, wherein said first load axis aperture is proximate to a bottom of said first alignment guide and said second load axis aperture is proximate to a second bottom of said second alignment guide.

4. The releasable connection frame assembly according to claim 3, wherein said first load axis aperture and said second load axis aperture are aligned relative to each other.

5. The releasable connection frame assembly according to claim 1, at least one of said first structural support and said second structural support having a central section having a third connecting plate and a fourth connecting plate, said third connecting plate and said fourth connecting plate extending outwardly from said central section in a direction which is perpendicular relative to said right connecting plate and said left connecting plate.

6. The releasable connection frame assembly according to claim 5, wherein said third connecting plate has a third alignment guide, third angular descending guide edges, and a third load axis aperture, and said fourth connecting plate has a fourth alignment guide, fourth angular descending guide edges, and a fourth load axis aperture, wherein said third connecting plate and said fourth connecting plate are reverse images relative to each other.

7. The releasable connection frame assembly according to claim 6, wherein said third connecting plate and said fourth connecting plate extend outwardly from said central section in an identical direction, said third connecting plate and said fourth connecting plate being parallel to each other, and said third alignment guide and said fourth alignment guide being disposed toward an interior between said third connecting plate and said fourth connecting plate.

8. The releasable connection frame assembly according to claim 1, said first structural support having an inside, at least one of said first structural support and said second structural support having a quick release end and quick release end opposite sides, a third load pin aperture proximate to said quick release end on one of said quick release opposite sides, a third release pin aperture proximate to said third load pin aperture on one of said quick release opposite sides and distal relative to said quick release end, a fourth load pin aperture proximate to said quick release end on the other of said quick release opposite sides, a fourth release pin aperture proximate to said fourth load pin aperture on the other of said quick release opposite sides and distal relative to said quick release end.

9. The releasable connection frame assembly according to claim 8, having a second quick release assembly engaged to said inside of said quick release end, said second quick release assembly having a second spring, said second spring having a third prong and a fourth prong, said third prong having a third load pin disposed in said third load pin aperture and a third release pin disposed in said third release pin aperture, said fourth prong having a fourth load pin disposed in said fourth load pin aperture and a fourth release pin disposed in said fourth release pin aperture.

10. The releasable connection frame assembly according to claim 9, wherein said second spring has a second expanded configuration where said third prong is proximate to said inside of one of said quick release end opposite sides and said third load pin extends through said third load pin aperture and said third release pin extends through said third release pin aperture.

11. The releasable connection frame assembly according to claim 10, wherein said fourth prong is proximate to said inside of the other of said quick release end opposite sides and said fourth load pin extends through said fourth load pin aperture, and said fourth release pin extends through said fourth release pin aperture, said second spring having a second retracted configuration where said third release pin and said fourth release pin have been moved towards each other compressing said second spring and said third load pin has been retracted towards said inside within said third load pin aperture and said fourth load pin has been retracted towards said inside within said second load pin aperture.

12. The releasable connection frame assembly according to claim 8, said quick release end having a quick release end cap, said quick release end cap having a quick release stop extending into said inside, said quick release stop having two exterior quick release stop edges.

13. The releasable connection frame assembly according to claim 12, wherein in said second retracted configuration said third prong is in contact with one of said two exterior quick release stop edges and said fourth prong is in contact with the other of said two exterior quick release stop edges limiting compression of said second spring and limiting retraction of said third load pin within said third load pin aperture and limiting retraction of said third release pin within said third release pin aperture, limiting retraction of said fourth load pin within said fourth load pin aperture and limiting retraction of said fourth release pin within said fourth release pin aperture.

14. The releasable connection frame assembly according to claim 13, wherein one of said two exterior quick release stop edges limits retraction of said third load pin within said third load pin aperture and said fourth load pin within said fourth load pin aperture.

\* \* \* \* \*